United States Patent
Clark et al.

(10) Patent No.: US 11,682,160 B2
(45) Date of Patent: *Jun. 20, 2023

(54) INTERSECTION TESTING IN A RAY TRACING SYSTEM USING MULTIPLE RAY BUNDLE INTERSECTION TESTS

(71) Applicant: Imagination Technologies Limited, Kings Langley (GB)

(72) Inventors: Gregory Clark, Hemel Hempstead (GB); Steven J. Clohset, San Francisco, CA (US); Luke T. Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,147

(22) Filed: Mar. 1, 2022

(65) Prior Publication Data
US 2022/0189097 A1      Jun. 16, 2022

Related U.S. Application Data

(63) Continuation of application No. 16/914,908, filed on Jun. 29, 2020, now Pat. No. 11,295,509.

(51) Int. Cl.
*G06T 15/06* (2011.01)
*G06T 7/13* (2017.01)
*A63F 13/52* (2014.01)

(52) U.S. Cl.
CPC ............... *G06T 15/06* (2013.01); *G06T 7/13* (2017.01); *A63F 13/52* (2014.09); *A63F 2300/66* (2013.01); *G06T 2210/12* (2013.01)

(58) Field of Classification Search
CPC ....... G06T 15/06; G06T 7/13; G06T 2210/12; G06T 2210/21; A63F 13/52; A63F 2300/66
See application file for complete search history.

(56) References Cited

U.S. PATENT DOCUMENTS 8,264,484 B1 * 9/2012 Lauterbach ............. G06T 15/06
345/419
8,284,188 B1 * 10/2012 Lauterbach ............. G06T 15/06
345/419

(Continued)

OTHER PUBLICATIONS

Anonymous; "Coherency gathering in ray tracing: the benefits of hardware ray tracking—Imagination"; Feb. 11, 2020; Retrieved from the Internet: URL:https://www.imaginationtech.com/blog/coherency-gathering-in-ray-tracing-the-benefits-of-hardware-ray-tracking; 14 pages.

(Continued)

*Primary Examiner* — Frank S Chen
(74) *Attorney, Agent, or Firm* — Potomac Law Group, PLLC; Vincent M DeLuca

(57) ABSTRACT

Ray tracing systems and computer-implemented methods are described for performing intersection testing on a bundle of rays with respect to a box. Silhouette edges of the box are identified from the perspective of the bundle of rays. For each of the identified silhouette edges, components of a vector providing a bound to the bundle of rays are obtained and it is determined whether the vector passes inside or outside of the silhouette edge. Results of determining, for each of the identified silhouette edges, whether the vector passes inside or outside of the silhouette edge, are used to determine an intersection testing result for the bundle of rays with respect to the box.

18 Claims, 15 Drawing Sheets

(56) References Cited

U.S. PATENT DOCUMENTS

| | | | |
|---|---|---|---|
| 10,360,720 | B1 | 7/2019 | Nevraev et al. |
| 10,912,877 | B2 | 2/2021 | Fabig et al. |
| 11,315,327 | B1 * | 4/2022 | Seiler ............... G06V 20/20 |
| 2003/0160798 | A1 | 8/2003 | Buehler |
| 2006/0066607 | A1 | 3/2006 | Schmittler et al. |
| 2007/0132754 | A1 * | 6/2007 | Reshetov ............. G06T 15/50 345/419 |
| 2008/0043018 | A1 * | 2/2008 | Keller ............... G06T 15/55 345/426 |
| 2008/0231633 | A1 * | 9/2008 | Keller ............... G06T 15/40 345/426 |
| 2009/0128562 | A1 | 5/2009 | McCombe et al. |
| 2009/0256845 | A1 | 10/2009 | Sevastianov et al. |
| 2009/0262132 | A1 | 10/2009 | Peterson et al. |
| 2009/0284524 | A1 | 11/2009 | Shearer et al. |
| 2010/0060634 | A1 | 3/2010 | Wald et al. |
| 2010/0073369 | A1 | 3/2010 | McCombe et al. |
| 2010/0073370 | A1 * | 3/2010 | McCombe ............ G06T 15/06 707/E17.014 |
| 2010/0194751 | A1 | 8/2010 | Wald et al. |
| 2012/0139926 | A1 | 6/2012 | Clohset et al. |
| 2014/0063016 | A1 | 3/2014 | Howson et al. |
| 2016/0275209 | A1 | 9/2016 | Kelly et al. |
| 2017/0263044 | A1 | 9/2017 | Peterson et al. |
| 2017/0284622 | A1 | 10/2017 | Rehn et al. |
| 2017/0372448 | A1 | 12/2017 | Wald et al. |
| 2018/0096516 | A1 | 4/2018 | Luebke et al. |
| 2019/0035138 | A1 | 1/2019 | Fuetterling |
| 2020/0051314 | A1 | 2/2020 | Laine et al. |
| 2020/0143585 | A1 | 5/2020 | Seiler et al. |
| 2021/0407172 | A1 | 12/2021 | Clark et al. |

OTHER PUBLICATIONS

Boulos et al; "Adaptive Ray Packet Reordering" IEEE/EG Symposium on Interactive Ray Tracing 2008; pp. 131-138.

Boulos et al; "Geometric and Arithmetic Culling Methods for Entire Ray Packets"; URL: https://graphics.stanford.edu/-boulos/papers/ia.pdf; pp. 1-8.

Mahovsky et al; "Fast Ray-Axis Aligned Bounding Box Overlap Tests with Plücker Coordinates"; vol. 9; No. 1 pp. 35-46.

Overbeck et al; "Large Ray Packets for Real-time Whitted Ray Tracing" Interactive Ray Tracing; pp. 1-8.

Pharr et al; "Rendering complex scenes with memory-coherent ray tracing"; Proceedings Of the 24th Annual Conference on Computer Graphics and Interactive Techniques; Aug. 3, 1997; pp. 101-108.

Reshetov et al; "Multi-Level Ray Tracing Algorithm" 2005; pp. 1176-1185.

* cited by examiner

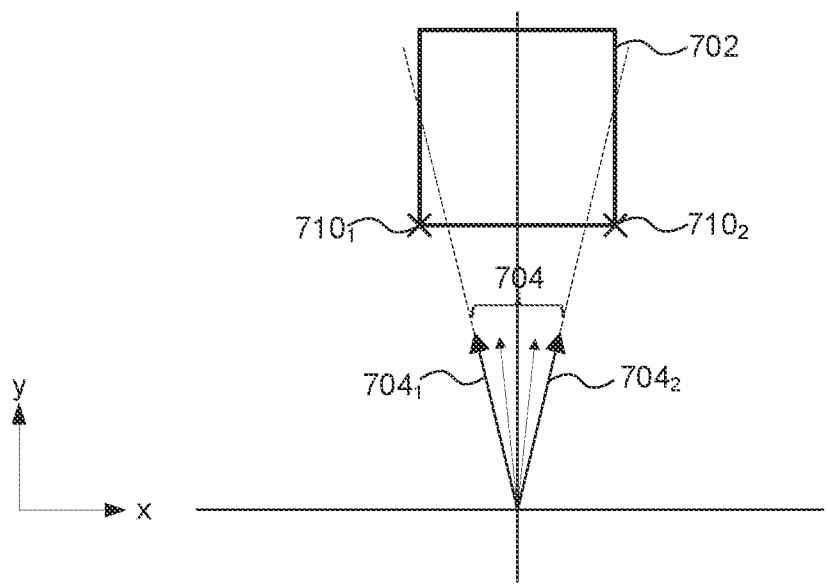
FIGURE 7
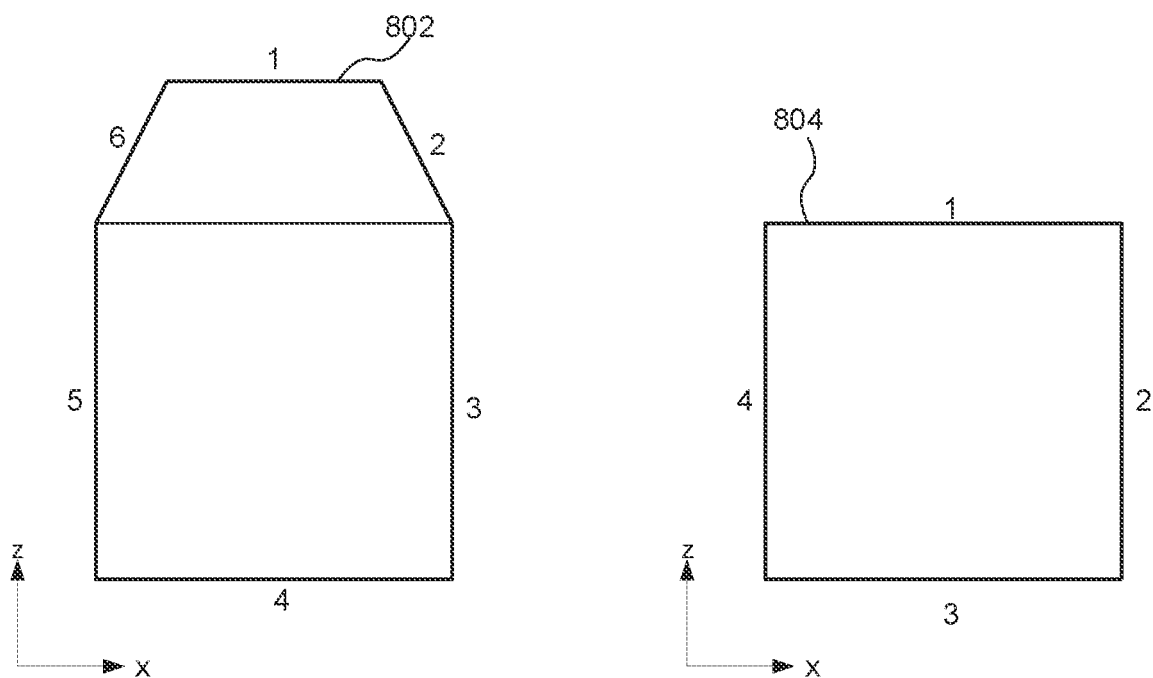
FIGURE 8a
FIGURE 8b

INTERSECTION TESTING IN A RAY TRACING SYSTEM USING MULTIPLE RAY BUNDLE INTERSECTION TESTS

CROSS REFERENCE TO RELATED APPLICATIONS AND CLAIM OF PRIORITY

This application is a continuation under 35 U.S.C. 120 of copending application Ser. No. 16/914,908 filed Jun. 29, 2020.

FIELD

The present disclosure is directed to techniques of performing intersection testing in a ray tracing system.

BACKGROUND

Ray tracing is a computational rendering technique for generating an image of a scene (e.g. a 3D scene) by tracing paths of light ('rays') from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. A "tree node" refers to a node which has pointers to other nodes in the hierarchical acceleration structure (i.e. a tree node has child nodes in the hierarchical acceleration structure). A "leaf node" refers to a node which has one or more pointers to one or more primitives (i.e. a leaf node does not have child nodes in the hierarchical acceleration structure). In other words, leaf nodes of the acceleration structure represent regions bounding one or more objects in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (which may be referred to herein as "boxes"). In some examples the nodes represent axis-aligned bounding boxes (AABBs) in the scene.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect with a leaf node then it can be tested against the objects within the region represented by the leaf node to thereby determine which object(s) the ray intersects with. If more than one intersection is found for a ray then the closest of the intersection points to the ray's origin (i.e. the first intersection that the ray encounters in the scene) can be identified and the ray is determined to intersect at this identified closest intersection. The use of an acceleration structure (rather than testing rays directly with objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the orientation is not predetermined.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided herein a ray tracing system comprising:
a tester module configured to receive a bundle of rays to be tested for intersection with a box, wherein the tester module comprises:
a first testing block configured to perform a first bundle intersection test to determine whether or not all of the rays of the bundle intersect the box, wherein if the first bundle intersection test determines that all of the rays of the bundle intersect the box, an intersection testing result for the bundle with respect to the box is that all of the rays of the bundle intersect the box; and
a second testing block configured to perform a second bundle intersection test to determine whether or not all of the rays of the bundle miss the box, wherein if the second bundle intersection test determines that all of the rays of the bundle miss the box, the intersection testing result for the bundle with respect to the box is that all of the rays of the bundle miss the box, and
wherein the tester module is configured to, if the first bundle intersection test does not determine that all of the rays of the bundle intersect the box and if the second bundle intersection test does not determine that all of the rays of the bundle miss the box:
split the bundle of rays up into individual rays; and
perform intersection tests for the individual rays with respect to the box to determine which of the individual rays intersect the box.

The second testing block may be configured to perform said second bundle intersection test irrespective of the result of the first bundle intersection test performed by the first testing block.

The tester module may be configured to cause the first testing block to perform the first bundle intersection test for the bundle with respect to the box in parallel with the second testing block performing the second bundle intersection test for the bundle with respect to the box.

The second testing block may be configured to perform said second bundle intersection test for the bundle with respect to the box in response to the result of the first bundle intersection test performed by the first testing block for the bundle with respect to the box being that the first bundle intersection test did not determine that all of the rays of the bundle intersect the box.

The tester module may be configured to use one or both of the first testing block and the second testing block to perform said intersection tests for the individual rays with respect to the box.

The tester module may comprise:
a set of one or more first testing blocks, wherein each of the one or more first testing blocks is configured to perform a first bundle intersection test to determine whether or not all rays of a bundle intersect a box; and
a set of one or more second testing blocks, wherein each of the one or more second testing blocks is configured to perform a second bundle intersection test to determine whether or not all rays of a bundle miss a box,
wherein the testing blocks are organised into pairs of testing blocks, each pair of testing blocks comprising: (i) one first testing block from the set of one or more first testing blocks, and (ii) one second testing block from the set of one or more second testing blocks.

The tester module may be configured to pass a bundle of rays and data representing a box to a pair of testing blocks, such that the first testing block of the pair of testing blocks performs the first bundle intersection test on the bundle of rays with respect to the box, and the second testing block of the pair of testing blocks performs the second bundle intersection test on the bundle of rays with respect to the box.

The tester module may be configured to pass first and second individual rays and data representing a box to a pair of testing blocks, such that the first testing block of the pair of testing blocks performs an intersection test on the first individual ray with respect to the box, and the second testing block of the pair of testing blocks performs an intersection test on the second individual ray with respect to the box.

The tester module may further comprise a results processor configured to process the intersection testing result for the bundle of rays with respect to the box.

The tester module may further comprise a memory configured to store data describing the box which has been fetched from a memory for performing said intersection testing with respect to the box.

The ray tracing system may further comprise a bundle builder configured to:
receive rays; and
group received rays together based on their similarity to thereby construct bundles of rays to be tested for intersection with the box.

The bundle builder may be configured to:
maintain a set of open bundles to which new rays can be added; and
for each of the received rays:
determine a level of similarity of the received ray with each of the open bundles;
identify a best match open bundle of said set of open bundles for the received ray based on the determined levels of similarity; and
if the determined level of similarity for the best match open bundle is above a threshold, add the received ray to the best match open bundle.

The bundle builder may be further configured to, for each of the received rays:
if the determined level of similarity for the best match open bundle is below the threshold, create a new bundle and add the received ray to the new bundle.

Said received rays which are grouped together to construct bundles may: (i) include new rays which have not previously been included in a bundle of rays, but (ii) not include rays which have previously been included in a bundle of rays.

Said received rays which are grouped together to construct bundles may include:
new rays which have not previously been included in a bundle of rays, and
rays which have previously been included in a bundle of rays which has been deconstructed.

The ray tracing system may further comprise a scheduler configured to:
form packets comprising one or both of indications of rays and indications of bundles of rays which will require access to the same block of memory for performing intersection testing; and
cause data to be fetched from the block of memory and passed to the tester module for performing intersection testing on the one or both of rays and bundles of rays indicated by the indications in the packet.

There is provided a ray tracing system configured to perform any of the methods described herein.

There is provided a computer-implemented method of performing intersection testing in a ray tracing system, the method comprising:
receiving a bundle of rays to be tested for intersection with a box;
performing a first bundle intersection test to determine whether or not all of the rays of the bundle intersect the box, wherein if the first bundle intersection test determines that all of the rays of the bundle intersect the box, an intersection testing result for the bundle with respect to the box is that all of the rays of the bundle intersect the box; and
if the first bundle intersection test does not determine that all of the rays of the bundle intersect the box, using a result of performing a second bundle intersection test, which determines whether or not all of the rays of the bundle miss the box, to determine the intersection testing result for the bundle with respect to the box,
wherein if the result of performing the second bundle intersection test indicates that all of the rays of the bundle miss the box, the intersection testing result for the bundle with respect to the box is that all of the rays of the bundle miss the box, and
wherein if the first bundle intersection test does not determine that all of the rays of the bundle intersect the box and if the result of performing the second bundle intersection test does not indicate that all of the rays of the bundle miss the box, then the method further comprises:
splitting the bundle of rays up into individual rays; and
performing intersection tests for the individual rays with respect to the box to determine which of the individual rays intersect the box.

There may be only two possible results from the first bundle intersection test: either (i) the first bundle intersection test determines that all of the rays of the bundle intersect the box, or (ii) the first bundle intersection test does not determine that all of the rays of the bundle intersect the box.

There may be only two possible results from the second bundle intersection test: either (i) the second bundle intersection test determines that all of the rays of the bundle miss the box, or (ii) the second bundle intersection test does not determine that all of the rays of the bundle miss the box.

The first and second bundle intersection tests may be performed in parallel for the bundle with respect to the box.

The second bundle intersection test may be performed for the bundle with respect to the box in response to the result of the first bundle intersection test for the bundle with respect to the box being that the first bundle intersection test did not determine that all of the rays of the bundle intersect the box.

Performing the first bundle intersection test for the bundle of rays with respect to the box may comprise:
  identifying silhouette edges of the box from the perspective of the bundle of rays;
  for each of the identified silhouette edges:
    obtaining components of a vector providing an external bound to the bundle of rays with respect to said identified silhouette edge, such that the vector is at least as likely as any of the rays of the bundle to pass outside said identified silhouette edge; and
    determining whether the vector passes inside or outside of the silhouette edge; and
  using results of determining, for each of the identified silhouette edges, whether the vector passes inside or outside of the silhouette edge, to determine an intersection testing result for the bundle of rays with respect to the box,
  wherein if it is determined that, for each of the identified silhouette edges, the vector passes inside the respective identified silhouette edge, then the intersection testing result for the bundle of rays with respect to the box is that all of the rays in the bundle of rays intersect the box; and
  wherein if it is determined that, for one or more of the identified silhouette edges, the vector passes outside the respective identified silhouette edge, then the intersection testing result for the bundle of rays with respect to the box is not that all of the rays in the bundle of rays intersect the box.

Performing the second bundle intersection test for the bundle of rays with respect to the box may comprise:
  identifying silhouette edges of the box from the perspective of the bundle of rays;
  for each of the identified silhouette edges:
    obtaining components of a vector providing an internal bound to the bundle of rays with respect to said identified silhouette edge, such that the vector is at least as likely as any of the rays of the bundle to pass inside said identified silhouette edge; and
    determining whether the vector passes inside or outside of the silhouette edge; and
  using results of determining, for each of the identified silhouette edges, whether the vector passes inside or outside of the silhouette edge, to determine an intersection testing result for the bundle of rays with respect to the box,
  wherein if it is determined that, for each of the identified silhouette edges, the vector passes inside the respective identified silhouette edge, then the intersection testing result for the bundle of rays with respect to the box is not that all of the rays in the bundle of rays miss the box; and
  wherein if it is determined that, for one or more of the identified silhouette edges, the vector passes outside the respective identified silhouette edge, then the intersection testing result for the bundle of rays with respect to the box is that all of the rays in the bundle of rays miss the box.

Data for a bundle of rays may be stored in a data structure and may comprise:
  origin data for the bundle of rays;
  vector data describing components of vectors providing bounds to the bundle of rays; and
  one or more pointers to ray data for the rays of the bundle of rays.

The box may be an axis-aligned bounding box.

There is described herein a computer-implemented method of performing intersection testing in a ray tracing system, the method comprising:
  receiving a bundle of rays to be tested for intersection with a box;
  identifying silhouette edges of the box from the perspective of the bundle of rays;
  for each of the identified silhouette edges:
    obtaining components of a vector providing a bound to the bundle of rays; and
    determining whether the vector passes inside or outside of the silhouette edge; and
  using results of determining, for each of the identified silhouette edges, whether the vector passes inside or outside of the silhouette edge, to determine an intersection testing result for the bundle of rays with respect to the box.

There is described herein a ray tracing system comprising:
  a tester module configured to receive a bundle of rays to be tested for intersection with a box, wherein the tester module comprises:
    a set of one or more testing blocks configured to perform intersection testing on the received bundle of rays with respect to the box by:
      identifying silhouette edges of the box from the perspective of the bundle of rays;
      for each of the identified silhouette edges:
        obtaining components of a vector providing a bound to the bundle of rays; and
        determining whether the vector passes inside or outside of the silhouette edge; and
      using results of determining, for each of the identified silhouette edges, whether the vector passes inside or outside of the silhouette edge, to determine an intersection testing result for the bundle of rays with respect to the box.

The ray tracing systems described herein may be embodied in hardware on an integrated circuit. There may be provided a method of manufacturing, at an integrated circuit manufacturing system, a ray tracing system. There may be provided an integrated circuit definition dataset that, when processed in an integrated circuit manufacturing system, configures the system to manufacture a ray tracing system. There may be provided a non-transitory computer readable storage medium having stored thereon a computer readable description of a ray tracing system that, when processed in an integrated circuit manufacturing system, causes the integrated circuit manufacturing system to manufacture an integrated circuit embodying a ray tracing system.

There may be provided an integrated circuit manufacturing system comprising: a non-transitory computer readable storage medium having stored thereon a computer readable description of the ray tracing system; a layout processing system configured to process the computer readable description so as to generate a circuit layout description of an integrated circuit embodying the ray tracing system; and an integrated circuit generation system configured to manufacture the ray tracing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

The present invention is described by way of example with reference to the accompanying drawings. In the drawings:

FIG. 7 illustrates another example of a bundle of rays to be tested for intersection with respect to a two dimensional box;

FIGS. 8a and 8b show two more examples of a three dimensional box as viewed from different perspectives;

Figure 1:
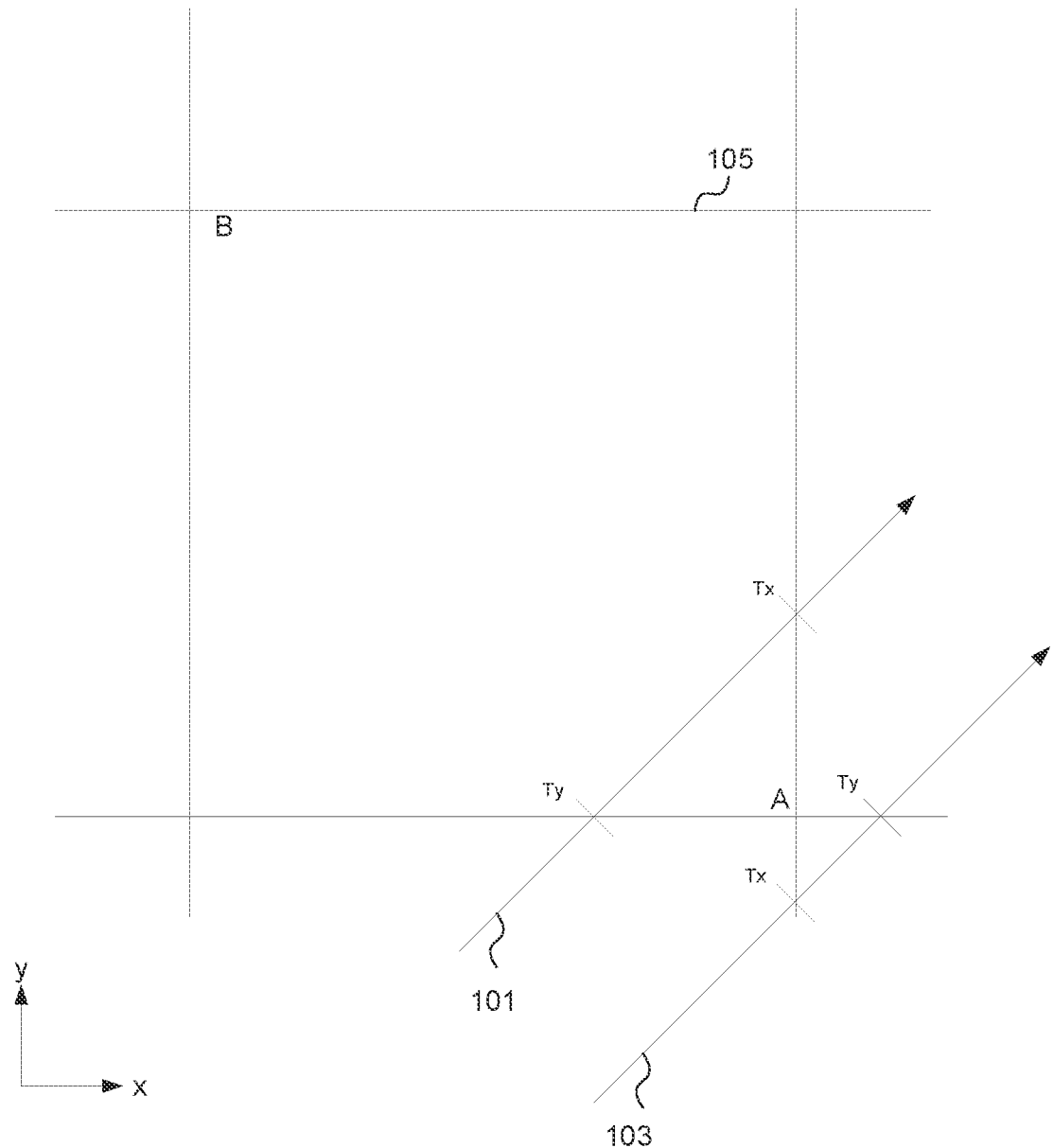
FIG. 1 shows a schematic illustration of an edge test to determine whether a ray intersects a 2D box.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Even when an acceleration structure is used, the amount of work involved in performing intersection testing in a ray tracing system is still very large. For example, ray tracing may be used for rendering an image of a 3D scene, where the image may have of the order of a million pixels. A primary ray may be traced for each sample position. In some examples, there may be one sample position for each pixel position, whilst in some other examples there may be multiple sample positions for each pixel position (e.g. to allow for processes such as multi-sample anti-aliasing (MSAA) to be performed when rendering the final pixel values). When a ray intersects with an object in the scene, a shader can be executed which may result in the emission of another ray (i.e. a "secondary ray") into the scene. Each primary ray may result in the emission of many secondary rays, which are all traced through the scene to determine their intersections. Therefore, it would not be unusual for there to be tens or hundreds of millions of rays traced through a scene for rendering an image. The complexity of scenes to be rendered tends to increase as graphics rendering technology develops, so it would not be unusual for there to be thousands of objects in a scene, each of which may be represented by many primitives. Furthermore, the images being rendered may represent frames of a sequence of frames which are to be rendered in real-time, e.g. for a display to a user in real-time. For example, the user may be playing a game wherein the rendered images represent a user's view of the 3D scene as the user plays the game. In order for the sequence of frames to appear like a continuous stream of video data, many frames may be rendered per second, e.g. 24, 30 or 60 frames per second to give some examples. It can therefore be appreciated that the work involved in performing intersection testing in a ray tracing system to render scenes to be output in real-time is vast.

One way to overcome this problem, and to perform ray tracing to render scenes to be output in real-time would be to have one or more supercomputers to perform all of the processing. This could be considered to be a 'brute force' approach. However, as well as an aim to have high performance (to perform ray tracing to render scenes to be output in real-time), there are also competing aims of reducing the size (e.g. silicon area) and power consumption of the ray tracing system. For example, there may be an aim to implement the ray tracing system on a mobile device, such as a tablet or smartphone, for which the acceptable size and power consumption may be much lower than for a supercomputer. As such, when designing a ray tracing system, there may be a trade-off between performance, power consumption and area. Depending on how this trade-off is implemented, examples described herein may allow the performance to be increased without a significant increase to the power consumption and area (compared to the prior art described above in the background section). Alternatively, in a different implementation of the trade-off, examples described herein may allow the power consumption and/or size of the ray tracing system to be decreased without significantly decreasing the performance of the ray tracing system (compared to the prior art described above in the background section). Different implementations can be designed to target different points in the trade-off between performance, power consumption and silicon area.

Often, when performing intersection testing for rays within a scene, many rays will be tested for intersection with respect to the same box (e.g. where the box represents a node in a hierarchical acceleration structure). In some situations, rays can be grouped together into a bundle of rays, and an intersection test can be performed for the bundle of rays. In a situation where the intersection testing results would be the same for all of the rays within a bundle then, rather than performing all of the intersection tests for each of the individual rays within the bundle, it may be possible to perform fewer intersection tests (e.g. one or two intersection tests) for the bundle of rays as a whole, and to use the result(s) of the test(s) to infer the intersection testing results for all of the rays in the bundle. In this situation, the test(s) used to infer intersection testing results for all of the rays in a bundle are referred to as bundle intersection test(s). It will be understood that the term 'bundle intersection test' does not refer to simply performing a separate test for each individual ray in the bundle. Instead, a bundle intersection test, which is performed on a bundle of rays, provides a bundle intersection testing result for the bundle as a whole, which may be used to infer intersection testing results that apply to all of the rays in the bundle. For example, if we can guarantee that all of the rays in a ray bundle have the same intersection testing result (e.g. hit or miss) with respect to a box then the result can be determined for the bundle as a whole, and used as the intersection testing results for all of the rays of the bundle. In this way, separate intersection tests for individual rays within at least some of the bundles may be avoided. Therefore, performing intersection testing on bundles of rays can reduce the overall number of intersection tests that are performed and can result in fewer accesses to memory for fetching ray data. As described in more detail below, the bundle intersection tests in examples described herein allow a single vector to be tested with respect to each silhouette edge of the box, to thereby provide an intersection testing result for the bundle. For example, for each silhouette edge of the box, a vector is obtained which provides a bound to the bundle of rays, and it can be determined whether that vector passes inside or outside of the silhouette edge. The results of determining, for each silhouette edge, whether the respective vector passes inside or outside of the silhouette edge can be used to determine an intersection testing result for the bundle of rays with respect to the box. By reducing (compared to the prior art) the number of calculations that need to be performed to determine whether the rays of a bundle intersect with a box, the intersection testing results can be determined faster, i.e. the latency of the ray tracing system can be reduced (or in other words, the performance of the ray tracing system can be increased), and the power consumption of the ray tracing system can be reduced.

As described in more detail below, two types of bundle intersection tests are described herein:

(i) A first bundle intersection test (which may be referred to herein as an "AllHit" intersection test) determines whether or not all of the rays of a bundle intersect a box. The first bundle intersection test may provide a binary outcome, such that there are only two possible results from the first bundle intersection test: either (i) the first bundle intersection test determines that all of the rays of the bundle intersect the box, or (ii) the first bundle intersection test does not determine that all of the rays of the bundle intersect the box.

(ii) A second bundle intersection test (which may be referred to herein as an "AnyHit" test) determines whether or not all of the rays of the bundle miss the box. In other words, the second bundle intersection test determines whether or not any of the rays of the bundle hit the box. The second bundle intersection test may provide a binary outcome, such that there are only two possible results from the second bundle intersection test: either (i) the second bundle intersection test determines that all of the rays of the bundle miss the box, or (ii) the second bundle intersection test does not determine that all of the rays of the bundle miss the box.

Very similar logic can be used to implement these two different types of bundle intersection tests, but with different bounding vectors being tested in respect of the respective silhouette edges of the box. Furthermore, in examples described below, the logic configured to perform these two types of bundle intersection tests can also correctly perform intersection tests on individual rays (each of which may be considered to be a bundle comprising only one ray). In this way, the ray tracing system does not need different dedicated testing blocks for performing intersection testing on individual rays and for performing intersection testing on bundles of rays, i.e. the same testing blocks can be used for testing individual rays and bundles of rays. This is particularly useful when the testing blocks are implemented in hardware (e.g. fixed-function circuitry) because it reduces the possibility of bottlenecking in the system due to one type of testing block being saturated whilst another type of testing block is idle.

These first and second bundle intersection tests may be implemented separately, and they can each provide a benefit in terms of reducing the number of intersection tests that need to be performed (where the same result (either hit or miss) would be found for all of the rays within a bundle). However, in some examples, both of these two types of bundle intersection tests may be implemented in the same ray tracing system. This can be particularly beneficial as it can avoid performing separate intersection tests for individual rays both if all of the rays of the bundle hit a box and if all of the rays of the bundle miss the box. In some examples, an AllHit test could be performed on a bundle of rays with respect to a box, and if the AllHit test determines that all of the rays of the bundle hit the box then the intersection testing result is that all of the rays of the bundle hit the box. If the AllHit test does not determine that all of the rays of the bundle hit the box then the AnyHit test can be performed on the bundle with respect to the box. If the AnyHit test determines that all of the rays of the bundle miss the box then the intersection testing result is that all of the rays of the bundle miss the box. If the intersection testing result has not yet been found then individual intersection tests may be performed for each of the rays to the bundle with respect to the box. In this example, the AnyHit test is performed conditionally, based on the result of the AllHit test. This is an example of how the method may be implemented in software. In different examples (e.g. when the method is implemented in hardware, e.g. fixed function circuitry), the AllHit test and the AnyHit test could be performed in parallel. In these examples, the AnyHit test would be performed irrespective of the result of the AllHit test. Performing the AllHit and AnyHit tests in parallel can reduce the latency of the method.

There will now be described a general example approach to performing intersection testing where a single ray is tested against a box. This is useful for going on to explain how a bundle of rays can be tested against a box. In a three dimensional (3D) example, the box is a 3D volume. In 3D examples, the box could be any suitable shape such as a cuboid (e.g. a cube), a sphere, a cylinder, a cone, a pyramid, a prism, etc. In a two dimensional (2D) example, the box is a 2D area. In these 2D examples, the box could be any suitable shape, such as a rectangle (e.g. a square), a circle, a triangle, a hexagon, etc. In examples described in detail herein, the edges of the box are aligned with the axes of the space in which ray tracing is performed. For example, the box may be an axis-aligned bounding box (AABB) and may correspond with a node of a hierarchical acceleration structure.

A ray can be expressed mathematically in vector form as:

$$r = o + Td \qquad (1)$$

where r is the ray, o is the ray's origin with respect to the coordinate system being used and d is the direction vector for the ray, and T is a scalar.

A plane can be expressed vectorially as a set of points p such that:

$$(p - p_0) \cdot n = 0 \qquad (2)$$

where $p_o$ is a known point on the plane and n is the normal vector to the plane. In other words, the set of points p satisfying equation (2) lie on the plane.

At an intersection between the ray and the plane r=p. The intersection distance between a ray origin and a plane (i.e. the distance between the ray origin and the intersection of the ray and the plane) can be found by combining equation (1) and equation (2) with r=p, and rearranging for T. In the example explained below, it is assumed that the plane is axis-aligned, i.e. aligned with the coordinate system, and thus the normal vector n contains only one non-zero component, which for a normalised vector is equal to 1 (although it is noted that in other examples, the planes defining the edges of the box might not be axis-aligned). For generality, denoting the non-zero component of the normal vector as the $i^{th}$ component (so for a three-dimensional example, i∈x,y,z), the combination of equations (1) and (2) can be rewritten as:

$$o_i + Td_i - p_{oi} = 0 \qquad (3)$$

And hence:

$$T = \frac{p_{oi} - o_i}{d_i} \qquad (4)$$

FIG. 1 shows an example of two rays 101 and 103 and a box 105. In this example, the box is two-dimensional (2D) for ease of illustration, and is defined by the space enclosed by four bounding edges. As shown, ray 101 intersects the box 105 and ray 103 does not intersect box 105.

To determine whether a ray intersects the 2D box 105, a side test on points A and B is performed, where A and B are at diametrically opposed corners of the box 105. Each side test is performed to determine what side of the point under test the ray passes on. In different examples, when the box is a 3D box, the side tests determine which side of an edge the ray passes on.

For performing intersection testing against point A, two intersection distances for each ray are determined. These intersection distances are denoted $T_x$ and $T_y$ in FIG. 1. $T_x$ is the distance between the origin of the ray and the point where the ray has the same x component as the point A; and $T_y$ is the distance between the origin of the ray and the point where the ray has the same y component as the point A.

For intersecting rays, e.g. for the intersecting ray 101, being tested with respect to point A:

$$T_y \leq T_x \qquad (5)$$

For the non-intersecting ray 103 being tested with respect to point A:

$$T_x < T_y \qquad (6)$$

Using the equation for T given by (4), it can be seen that the generalised inequality to be evaluated to determine what side of an edge (in a 3D example) or point (in a 2D example) a ray passes on is given by:

$$\frac{p_{oi} - o_i}{d_i} \leq \frac{p_{oj} - o_j}{d_j} \qquad (7)$$

To avoid the cost of performing a division operation, inequality (7) can be rewritten as:

$$(p_{oi} - o_i)d_j \leq (p_{oj} - o_j)d_i \qquad (8)$$

In the example shown in FIG. 1, point A is the bottom right corner of the box, i=y and j=x, and if the inequality (8) (or inequality (7)) is true then the ray passes on the inside of point A, whereas if the inequality (8) (or inequality (7)) is false then the ray passes on the outside of point A. A similar test is performed in respect of corner point B which is the top left corner of the box 105 (i.e. diametrically opposed to point A). For point B the values can be set as i=x and j=y (which is the opposite as for the test for point A), and if the inequality (8) (or inequality (7)) is true then the ray passes on the inside of point B, whereas if the inequality (8) (or inequality (7)) is false then the ray passes on the outside of point B. To determine that the ray intersects the box 105, the inequalities for both point A and B must be true, whereas if either inequality is false then it is determined that the ray does not intersect the box 105.

Figure 2:
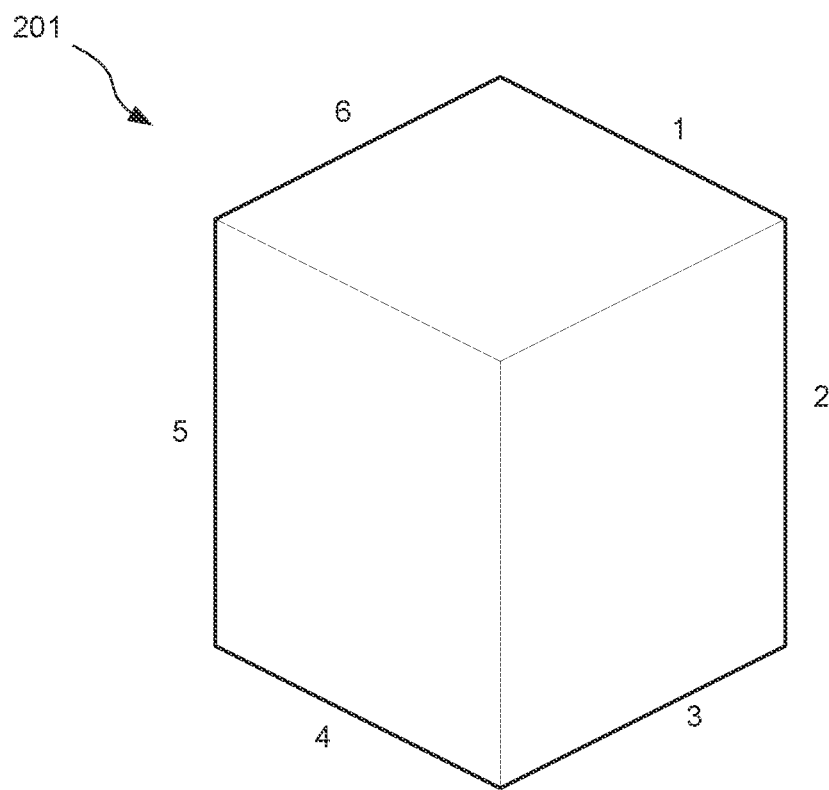
FIG. 2 shows a schematic illustration of a three-dimensional box against which rays are to be intersection tested.
Figure 2:
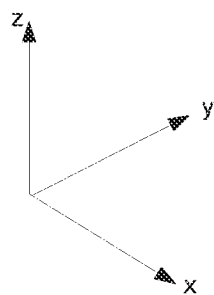

FIG. 2 shows an example of a 3D box 201 as viewed from the origin of a ray to be tested for intersection with respect to the box 201. In this example, the box 201 is an axis-aligned bounding box (AABB). Since the box 201 is axis-aligned, each of the edges of the box 201 is parallel to one of the x, y or z axes. The box is shown comprising a set of silhouette edges, labelled 1 to 6. A silhouette edge is an edge defining part of the silhouette of the box. The silhouette edges are determined from a line of sight along the direction of the ray vector, i.e. the box is depicted as viewed from a viewpoint, e.g. positioned at the ray's origin and directed along the direction of the ray. In other words, the silhouette edges, labelled 1 to 6 in FIG. 2, are the edges of a 2D projection of the box 201 as viewed from the perspective of a ray travelling from its origin. The box 201 is a cuboid in the example shown in FIG. 2, such that the box 201 has either four or six silhouette edges depending upon the perspective from which the box is viewed. The box 201 shown in FIG. 2 is merely for illustration and could, for example, represent the volume corresponding to a root note, a parent node, a child node and/or a leaf node in an acceleration structure.

In this 3D example, the intersection of two planes forms a line rather than a point as in the 2D case. Thus, the side test, performed on a 3D box, is used to determine what side of a silhouette edge (which takes the form of a line) the ray passes on, wherein the side test performed on a 3D box may be referred to herein as an "edge test". To determine whether a ray intersects the box 201, an intersection test is performed for each of the silhouette edges 1 to 6. Each intersection test comprises performing the comparison of values specified in inequality (8).

The box 201 is formed from six planes, wherein for each axis (x, y, z) two of the planes have a normal parallel to that axis, such that the component value of those planes for that axis are constant across each of the planes. Of the two parallel planes, one will have a higher component value along the relevant axis. Therefore, for each axis there is a maximum and a minimum component value defined by the planes defining the box 201. The minimum values along each axis ($x_{min}$, $y_{min}$ and $z_{min}$) can define a 'minimum' position as a vector $p_{min}$, where $p_{min}=(x_{min},y_{min},z_{min})$ and the maximum values along each axis ($x_{max}$, $y_{max}$ and $z_{max}$) can define a 'maximum' position as a vector $p_{max}$, where $p_{max}=(x_{max},y_{max},z_{max})$. Therefore, Amin and $p_{max}$ are diametrically opposed corner positions of the box 201 and can be used in inequality (8) for the edge comparison tests.

To simplify the edge comparison tests, the vectors $p'_{min}$ and $p'_{max}$ can be defined (and e.g. pre-computed) as:

$$p'_{min} = p_{min} - o \quad (9)$$

$$p'_{max} = p_{max} - o \quad (10)$$

The vectors $p'_{min}$ and $p'_{max}$ represent the displacement between the ray origin (o) and $p_{min}$ and $p_{max}$ respectively. As described above, because the box 201 is axis-aligned, it follows that there are two planes of the bounding box lying on each axis, i.e. two 'x' planes (planes having constant x components), two 'y' planes (planes having constant y components) and two 'z' planes (planes having constant z components). The components of the vector $p'_{min}$ represent the displacements in x, y and z components from the ray origin to the minimum x, y and z planes. The components of the vector $p'_{max}$ represent the displacements in x, y and z components from the ray origin to the maximum x, y and z planes.

Which of the minimum or maximum planes are chosen to evaluate inequality (8) will depend on which two planes intersect at the silhouette edge being tested.

Equations (9) and (10) can be used to re-write inequality (8) as:

$$p'_i d_j \leq p'_j d_i \quad (11)$$

where $p'_i = p_{min,i} - o_i$ or $p'_i = p_{max,i} - o_i$, and $p'_j = p_{min,j} - o_j$ or $p'_j = p_{max,j} - o_j$.

For example, silhouette edge 6 shown in FIG. 2 is along the intersection between the minimum x plane (i.e. of the two planes which have constant x values, the plane having the smaller x value) and the maximum z plane (i.e. of the two planes which have constant z values, the plane having the larger z value). The ray will pass the intersection test based on edge 6 if the ray intersects with the maximum z plane before it intersects with the minimum x plane, i.e. if $p'_{max,z} d_x \leq p'_{min,x} d_z$, where $p'_{max,z} = p_{max,z} - o_z$ and $p'_{min,x} = p_{min,x} - o_x$.

As another example, silhouette edge 2 shown in FIG. 2 is along the intersection between the maximum x plane (i.e. of the two planes which have constant x values, the plane having the larger x value) and the maximum y plane (i.e. of the two planes which have constant y values, the plane having the larger y value). The ray will pass the intersection test based on edge 2 if the ray intersects with the maximum x plane before it intersects with the maximum y plane, i.e. if $p'_{max,x} d_y \leq p'_{max,y} d_x$, where $p'_{max,x} = p_{max,x} - o_x$ and $p'_{max,y} = p_{max,y} - o_y$.

It will be apparent how to perform the tests for each of the six silhouette edges labelled 1 to 6 in FIG. 2. If all six tests are passed then it is determined that the ray intersects the box 201. However, if any one or more of the six tests fails then it is determined that the ray does not intersect with the box 201, i.e. the ray passes outside one or more of the six silhouette edges.

Thus, to perform a ray intersection test for box 201, an edge test is performed for each silhouette edge 1 to 6 to determine what side of each of those edges the ray passes on, where each edge test involves performing an evaluation to determine whether the condition specified in equation (11) is true for the two planes forming the edge under test.

As described in more detail below, distance and direction checks may also be performed to check whether the ray's origin and direction are such that the ray is travelling away from the box, or whether the ray endpoint falls short of the box. If either the ray is travelling away from the box, or the ray endpoint falls short of the box then the ray does not intersect with the box, and there is no need to perform the edge tests on the silhouette edges of the box.

Figure 3:
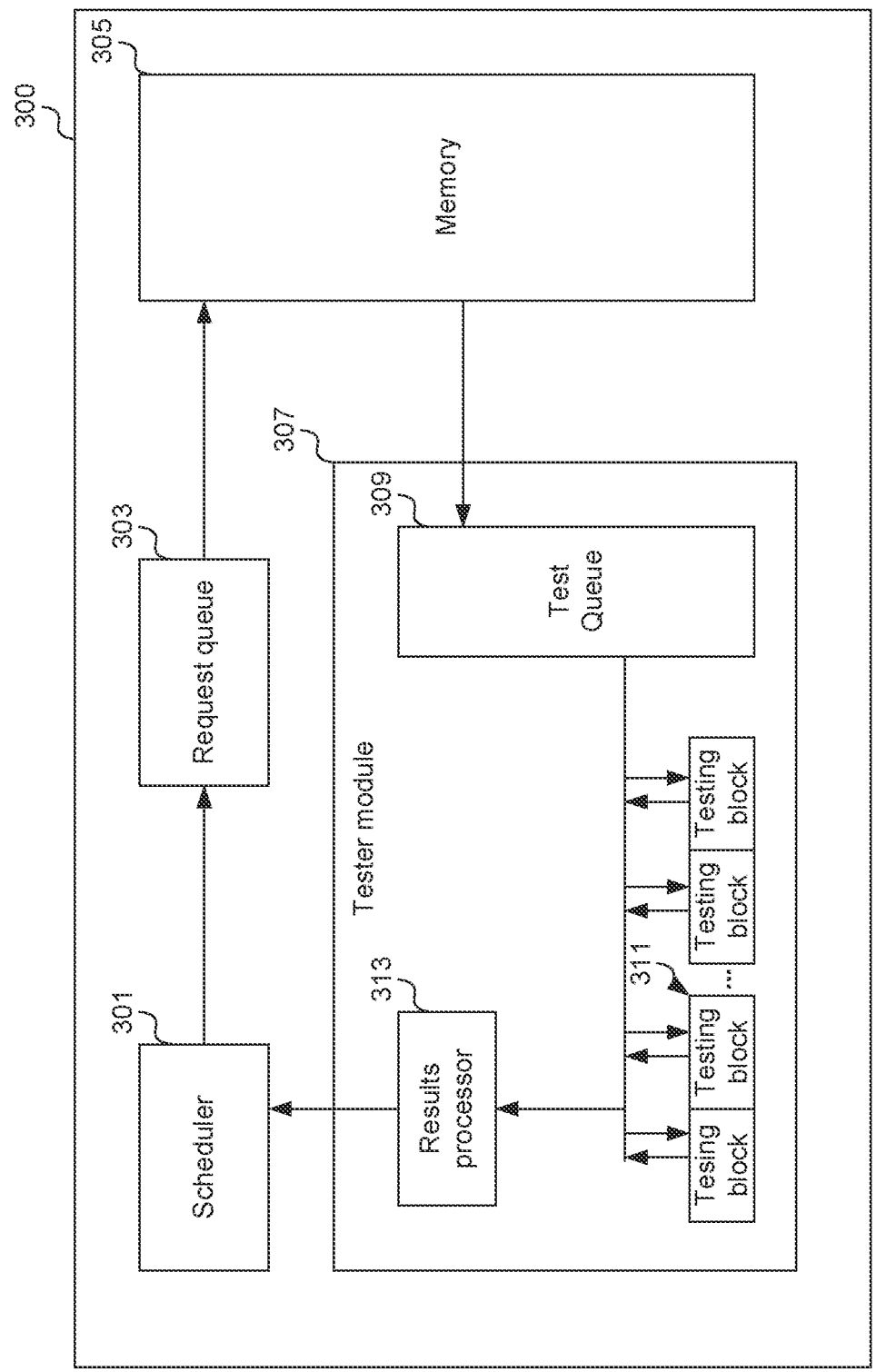
FIG. 3 shows a first example ray tracing system.

FIG. 3 shows an example of a ray tracing system for performing intersection testing. Ray tracing system 300 is configured to implement intersection testing of rays with boxes, e.g. axis-aligned boxes.

The ray tracing system 300 comprises a scheduler 301, request queue 303, memory 305 and a tester module 307. The tester module 307 comprises a test queue 309, a set of one or more testing blocks (denoted generally at 311) and a results processor 313. The request queue 303 and the test queue 309 may take the form of buffers, e.g. stacks (i.e. first-in-last-out (FILO) buffers) or first-in-first-out (FIFO) buffers. The testing blocks may be implemented as hardware units (e.g. using fixed-function circuitry) or in software, for example as shader code executed by a processing unit.

The scheduler 301 receives instructions to trace (i.e. to perform intersection testing for) a set of one or more rays. The scheduler can collect rays before the rays are issued to the request queue 303. The scheduler 301 may do this to group rays which require access to the same block or portion of the memory 305. The block or portion of the memory 305 may be a contiguous block of memory at a set of memory addresses which can be fetched from the memory 305 together. A group of rays that reference the same block of the memory 305 may be referred to as a packet. For example, rays which are to be tested with respect to the same box or object may be grouped into a packet, such that the data for the box or object can be fetched once from the memory 305 for use in the intersection testing of all of the rays in the packet. As an example, for the initial stage of the intersection testing, it may be the case that all rays will intersect the root node and thus require access to the same block of memory 305 and so fall within one packet. Once the scheduler has assembled one or more rays into a packet, the scheduler will issue the packet and cause the packet to join the request queue 303 to request the node data for the packet (i.e. data describing a box corresponding to the appropriate node of the acceleration structure against which the rays of the packet are to be tested for intersection) from memory 305. The node data for the packet is then retrieved from memory 305 and passed to the tester module 307.

At the tester module 307, the node data for a packet is received at the test queue 309. The ray data for the packet is also received at the tester module. The ray data for the packet may be received from a memory (e.g. memory 305), or in other examples it may be received from request queue 303 (via a link, not shown in FIG. 3), to be associated with the corresponding node data at test queue 309. The tester module 307 allocates rays from the packet to the testing blocks 311. The tester module 307 might allocate the rays sequentially. When a ray of the packet has been allocated to a testing block, that testing block performs intersection testing to determine whether that ray intersects the box corresponding to the node that ray is being tested against, e.g. by performing edge tests for the appropriate edges of the box, e.g. for the six silhouette edges of the box 201 labelled in FIG. 2, as described above.

The testing blocks each output the result of the intersection tests they have performed to the results processor 313. The results processor 313 processes the results of the intersection tests. Specifically, if a ray has been found to not intersect the node it was being tested against, the processor 313 does not schedule intersection tests for that ray in respect of the child nodes of the node which was not intersected. If the results processor 313 determines that a ray has intersected a node it was being tested against, that ray is output from the tester module 307 back to the scheduler 301, where it will be grouped into a packet and scheduled for intersection testing in respect of a child node of the intersected node.

The above-described process is repeated iteratively until the rays have no more hits. In response to an intersection of a ray with a leaf node, objects within that leaf node (e.g. triangles) are each scheduled for intersection testing with the ray. The tester module 307 may comprise object testing blocks (not shown in FIG. 3) configured to perform intersection tests for the rays that intersect a leaf node in respect of the object(s) within that leaf node. The objects may be described with triangular primitives, such that the object testing blocks are configured to test rays for intersection with respect to triangles in the scene. A person skilled in the art would know how to test a ray for intersection with a triangular primitive, and the details of this process are not described in detail herein. If the result of all the intersection testing for a ray is that the ray does not intersect with any objects in the scene then a 'miss' result is returned and can be processed accordingly. If the result of all the intersection testing for a ray is that the ray intersects with a single object then data for this intersection can be returned with a 'hit' result and processed accordingly. If the result of all the intersection testing for a ray is that the ray intersects with more than one object then the intersection distances for the intersections (i.e. the distances from the ray origin to the intersection points) are compared to find the 'closest hit', i.e. the intersection point closest to the ray origin (i.e. the intersection point with the smallest value of T). Data for this closest hit intersection can be returned with a 'hit result' and processed accordingly.

As described above, in examples described herein, rays can be grouped together into bundles, and then bundle intersection tests can be performed on the bundles of rays. This can reduce the number of intersection tests that need to be performed. The number of rays in a bundle can vary. There may be a maximum number of rays that can be included in a bundle, and this maximum number of rays may be different in different examples. For example, the maximum number of rays in a bundle could be 4, 16 or 32 just to give three examples.

Figure 4:
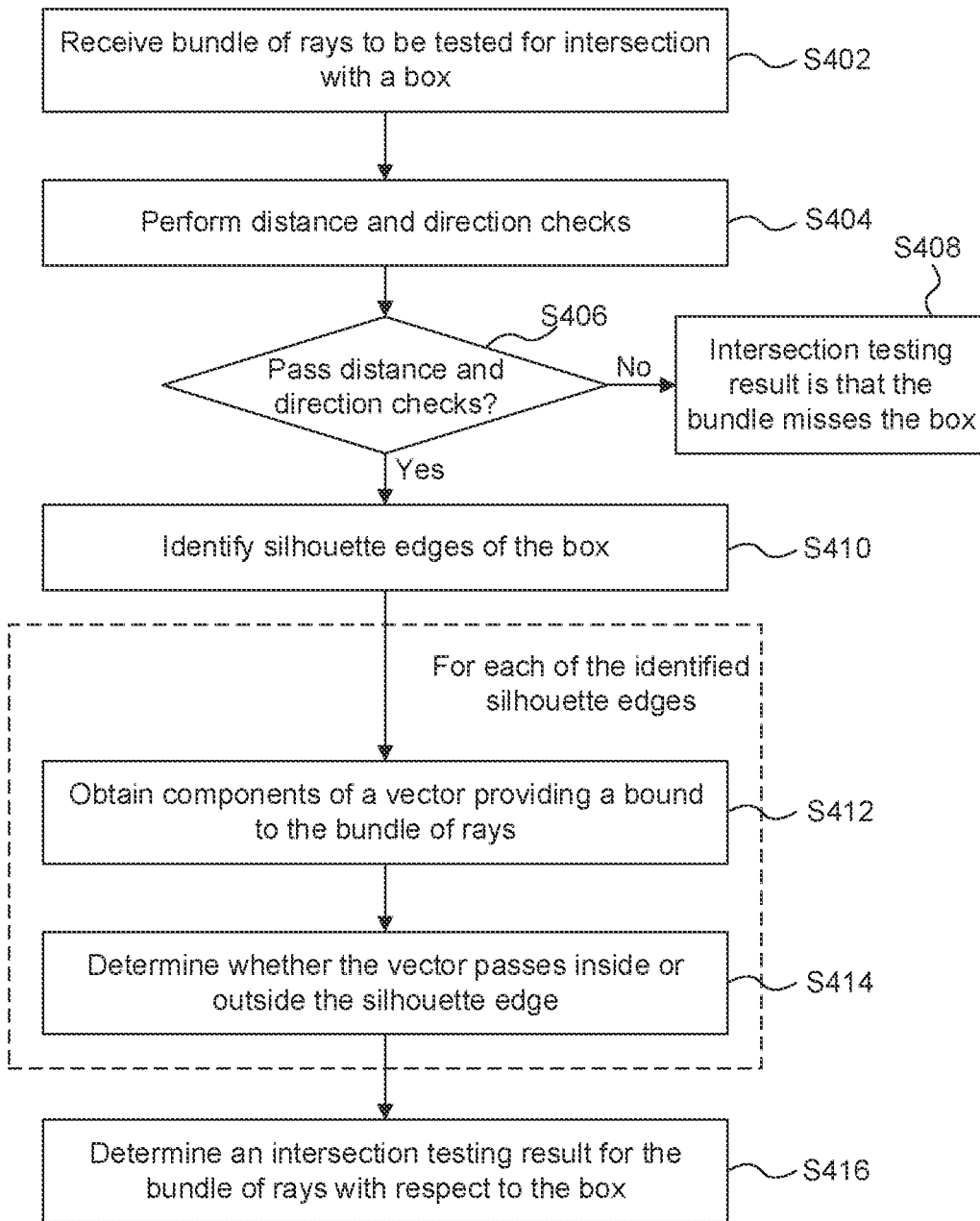
FIG. 4 is a flow chart for a first method of performing intersection testing in a ray tracing system.

The method described above for performing intersection testing for an individual ray with respect to a box can be extended to perform intersection testing for a bundle of rays with respect to a box. For example, FIG. 4 is a flow chart for a method of performing intersection testing for a bundle of rays, which may be performed by the tester module 307.

Figure 5:
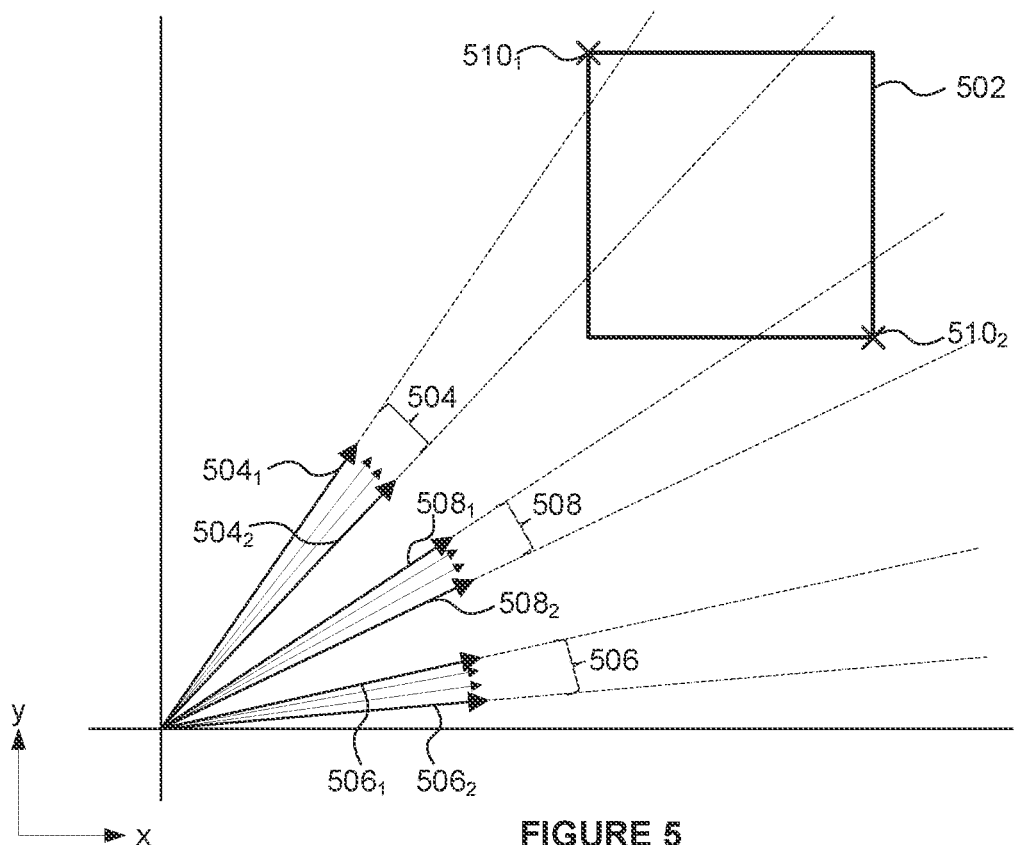
FIG. 5 shows three example bundles of rays to be tested for intersection with respect to a two dimensional box.

In step S402, a bundle of rays is received at the tester module 307. The bundle of rays is to be tested for intersection with a box. An example process for grouping rays together to form bundles is described below with reference to the flow chart shown in FIG. 10. In a first example, all of the rays within a bundle have the same origin (although in other examples the rays within a bundle may have different ray origins). The rays within a bundle can have different ray direction vectors. Vectors can be defined for a bundle to provide bounds to the bundle of rays, i.e. to define edges of the bundle. The bounding vectors for a bundle may tightly bound the rays within the bundle. For example, FIG. 5 shows a 2D example in which three bundles of rays (generally denoted 504, 506 and 508 in FIG. 5) are to be tested for intersection with a 2D box 502. The first bundle of rays 504 has two vectors $504_1$ and $504_2$ which provide the bounds to the first bundle of rays; the second bundle of rays 506 has two vectors $506_1$ and $506_2$ which provide the bounds to the second bundle of rays; and the third bundle of rays 508 has two vectors $508_1$ and $508_2$ which provide the bounds to the third bundle of rays. A bundle of rays and an indication of the box are provided to a testing block 311. Steps S404 to S416 may be performed by one of the testing blocks 311.

In step S404 a distance check and a direction check are performed for a bundle of rays with respect to a box. In step S406 it is determined whether the bundle of rays pass the distance and direction checks. The direction check determines whether the box is behind an origin of the bundle of rays. In other words, when looking from an origin of the bundle of rays, along a direction within the range of directions bounded by the bounding vectors for the bundle of rays, the direction check determines whether the box is behind the origin. For example, the direction check may involve, for each component (i.e. each of the x, y and z components, denoted generally as the $i^{th}$ component), if the component of a particular one of the bounding vectors of the bundle $(d_i)$ is positive, then checking whether the bundle origin has a greater component value $(o_i)$ than the maximum component value of the box $(p_{max,i})$; and if the component of a particular one of the bounding vectors of the bundle $(d_i)$ is negative, then checking whether the bundle origin has a smaller component value $(o_i)$ than the minimum component value of the box $(p_{min,i})$. If, for one or more of the components, either of these two conditions is satisfied then it can be determined that the ray will not intersect the box without needing to perform edge tests on the silhouette edges of the box. The particular one of the bounding vectors of the bundle to choose in the direction check may depend upon whether the bundle intersection test is a first bundle intersection test (i.e. an 'AllHit' test) which aims to determine whether all of the rays of the bundle hit the box, or a second bundle intersection test (i.e. an 'AnyHit' test) which aims to determine whether all of the rays of the bundle miss the box.

Figure 17:
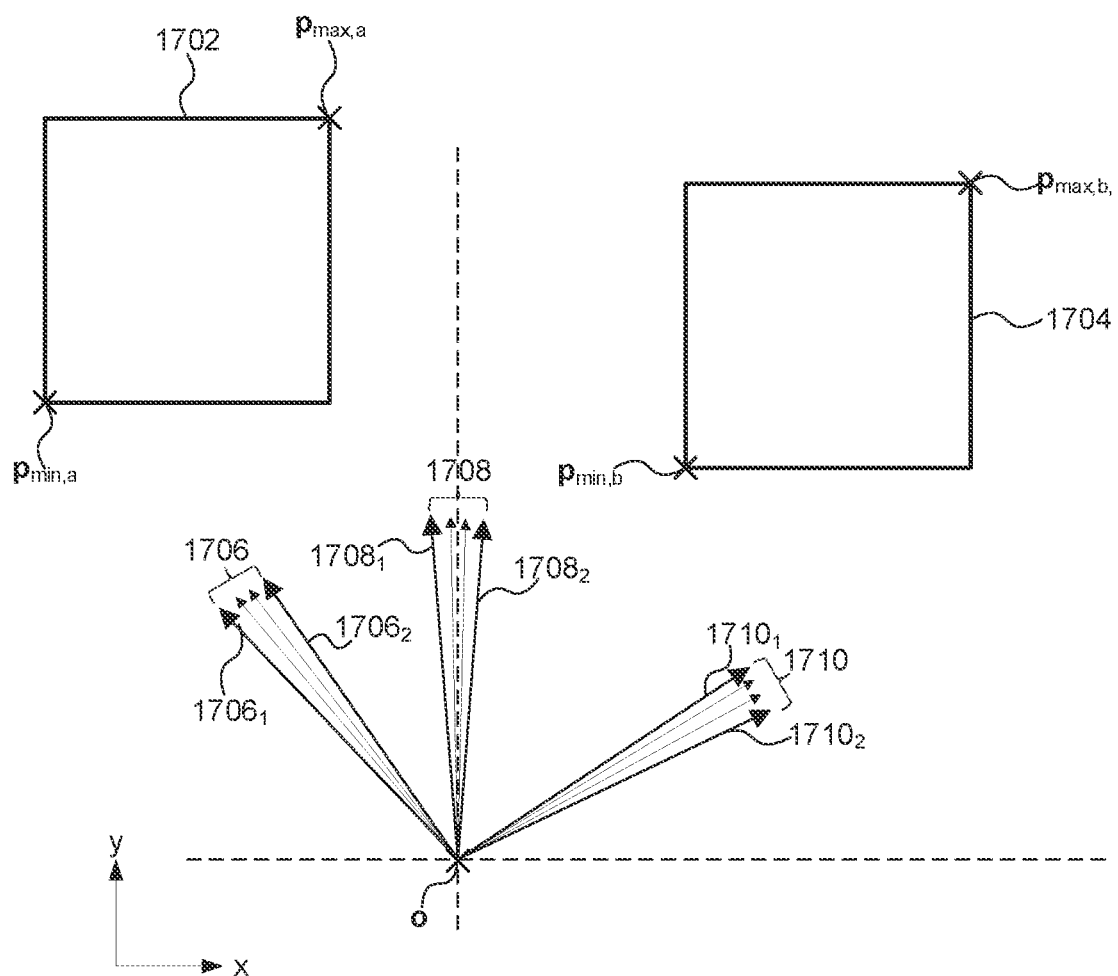
FIG. 17 shows three example bundles of rays to be tested for intersection with respect to two 2D boxes.

FIG. 17 shows a 2D example of two axis-aligned boxes: box 1702 (which has minimum and maximum components $p_{min,a}$ and $p_{max,a}$) and box 1704 which has minimum and maximum components $p_{min,b}$ and $p_{max,b}$). FIG. 17 also shows three bundles of rays: bundle 1706 which has bounding vectors $1706_1$ and $1706_2$ (both of which have negative x components), bundle 1708 which has bounding vectors $1708_1$ (which has a negative x component) and $1708_2$ (which has a positive x component), and bundle 1710 which has bounding vectors 1710$_1$ and 1710$_2$ (both of which have positive x components). All of the bundles 1706, 1708 and 1710 have their origin at a position o. For example, for an AnyHit test, the direction test is useful when the i$^{th}$ component of all (e.g. both) of the bounding vectors of the bundle have the same sign (e.g. when the i$^{th}$ component is the x component, that is true for bundles 1706 and 1710, but not for bundle 1708). For example, if the bounding vector with the smallest i$^{th}$ component has a positive i$^{th}$ component, implying that all of the bounding vectors have positive values for their i$^{th}$ components (e.g. the bounding vectors of bundle 1710 all have positive x components), then that bounding vector with the smallest i$^{th}$ component (e.g. bounding vector 1710$_1$) is the "particular one" of the bounding vectors mentioned above. Because the i$^{th}$ component of the "particular one" of the bounding vectors is positive, the direction check involves checking whether the bundle origin has a greater component value ($o_i$) than the maximum component value of the box ($p_{max,i}$). For example, the x component value of bounding vector 1710$_1$ is positive, so the direction check involves checking whether the x component of the bundle origin ($o_x$) is greater than the x components of $p_{max,a}$ (for box 1702) and $p_{max,b}$ (for box 1704). In the example shown in FIG. 17 the bundle 1710 will pass the direction check for an AnyHit test in respect of box 1704, but it will fail the direction check for an AnyHit test in respect of box 1702. If the bounding vector with the largest i$^{th}$ component has a negative i$^{th}$ component, implying that all of the bounding vectors have negative values for their i$^{th}$ components (e.g. the bounding vectors of bundle 1706 all have negative x components), then that bounding vector with the largest i$^{th}$ component (e.g. bounding vector 1706$_2$) is the "particular one" of the bounding vectors mentioned above. Because the i$^{th}$ component of the "particular one" of the bounding vectors is negative, the direction check involves checking whether the bundle origin has a smaller component value ($o_i$) than the minimum component value of the box ($p_{min,i}$). For example, the x component value of bounding vector 1706$_2$ is negative, so the direction check involves checking whether the x component of the bundle origin ($o_x$) is smaller than the x components of $p_{min,a}$ (for box 1702) and $p_{min,b}$ (for box 1704). In the example shown in FIG. 17 the bundle 1706 will pass the direction check for an AnyHit test in respect of box 1702, but it will fail the direction check for an AnyHit test in respect of box 1704. For the AnyHit test, if the i$^{th}$ components of the bounding vectors do not all have the same sign (e.g. for bundle 1708, the bounding vector with the smallest x component does not have a positive x component and the bounding vector with the largest x component does not have a negative x component) then the direction check does not provide a determination of whether there may be an intersection with the box. In contrast, for the AllHit test, the direction test may be useful even if the signs of the i$^{th}$ components of the bounding vectors are not all the same. For example, for an AllHit test, if the bounding vector with the largest i$^{th}$ component has an i$^{th}$ component which is positive (e.g. when the i$^{th}$ component is the x component, that is true for bundles 1708 and 1710), then that bounding vector with the largest i$^{th}$ component (e.g. bounding vector 1708$_2$ for bundle 1708 and bounding vector 1710$_2$ for bundle 1710) is a "particular one" of the bounding vectors mentioned above. Because the i$^{th}$ component of the "particular one" of the bounding vectors is positive, the direction check involves checking whether the bundle origin has a greater component value ($o_i$) than the maximum component value of the box ($p_{max,i}$). For example, the x component values of bounding vectors 1708$_2$ and 1710$_2$ are positive, so the direction checks for bundles 1708 and 1710 involve checking whether the x component of the bundle origin ($o_x$) is greater than the x components of $p_{max,a}$ (for box 1702) and $p_{max,b}$ (for box 1704). In the example shown in FIG. 17 the bundles 1708 and 1710 will pass the first direction check for an AllHit test in respect of box 1704, but they will fail the first direction check for an AllHit test in respect of box 1702. Similarly, for an AllHit test, if the bounding vector with the smallest i$^{th}$ component has an i$^{th}$ component which is negative (e.g. when the i$^{th}$ component is the x component, that is true for bundles 1706 and 1708), then that bounding vector with the smallest i$^{th}$ component (e.g. bounding vector 1706$_1$ for bundle 1706 and bounding vector 1708$_1$ for bundle 1708) is a "particular one" of the bounding vectors mentioned above. Because the i$^{th}$ component of the "particular one" of the bounding vectors is negative, the direction check involves checking whether the bundle origin has a smaller component value ($o_i$) than the minimum component value of the box ($p_{min,i}$). For example, the x component values of bounding vectors 1706$_1$ and 1708$_1$ are negative, so the direction checks for bundles 1706 and 1708 involve checking whether the x component of the bundle origin ($o_x$) is smaller than the x components of $p_{min,a}$ (for box 1702) and $p_{min,b}$ (for box 1704). In the example shown in FIG. 17 the bundles 1706 and 1708 will pass the second direction check for an AllHit test in respect of box 1702, but they will fail the second direction check for an AllHit test in respect of box 1704. If a bundle fails either of the direction checks for an AllHit test then it is determined to fail the direction test, so in the example shown in FIG. 17 bundle 1708 will fail the direction check for an AllHit test in respect of both boxes 1702 and 1704.

To summarise the direction checks:
for an All hit test, for each of the i$^{th}$ components:
if the i$^{th}$ component of either of the bounding vectors of a bundle is negative then a miss is found if $p_{min,i} > o_i$; and
if the i$^{th}$ component of either of the bounding vectors of a bundle is positive then a miss is found if $p_{max,i} < o_i$; and
for an AnyHit test, for each of the i$^{th}$ components:
if the i$^{th}$ component of both of the bounding vectors of a bundle are negative then a miss is found if $p_{min,i} > o_i$; and
if the i$^{th}$ component of both of the bounding vectors of a bundle are positive then a miss is found if $p_{max,i} < o_i$.

The distance check determines whether the bundle of rays terminates at a point in front of the box. A maximum distance that the rays of the bundle can travel in the scene before they are terminated (or "clipped") may be provided in the data for a bundle of rays. If the distance check determines that the bundle of rays terminates at a point in front of the box (i.e. before it reaches the box) then it can be determined that the intersection testing result is that the bundle of rays misses the box, without needing to perform edge tests on the silhouette edges of the box. For example, the distance check may involve, performing a check for each component (i.e. each of the x, y and z components, denoted generally as the i$^{th}$ component). The distance check may be determined to fail if an inequality is satisfied for any of the components. For example, for an AnyHit test, if $p_{min,i} > o_i$ then the distance check can determine, for each of the i$^{th}$ components, which of the bounding vectors has the largest value for its i$^{th}$ component and then it can be determined whether $p_{min,i} > o_i + T_{max} d_{i,max}$, where $T_{max}$ is the maximum value of T (i.e. the value of T at which the ray is clipped if it has not yet intersected with anything in the scene), where $d_{i,max}=\max(d_{i,1}, d_{i,2})$, and where $d_{i,1}$ is the $i^{th}$ component of the first bounding vector of the bundle and $d_{i,2}$ is the $i^{th}$ component of the second bounding vector of the bundle. In this example, the bundle has just two bounding vectors. In this example, if $p_{min,i}>o_i+T_{max}d_{i,max}$ then the distance check fails. For an AnyHit test, if $p_{max,i}<o_i$ then the distance check can determine, for each of the $i^{th}$ components, which of the bounding vectors has the smallest value for its $i^{th}$ component and then it can be determined whether $p_{max,i}<o_i+T_{max}d_{i,min}$, where $d_{i,min}=\min(d_{i,1},d_{i,2})$, and where $d_{i,1}$ is the $i^{th}$ component of the first bounding vector of the bundle and $d_{i,2}$ is the $i^{th}$ component of the second bounding vector of the bundle. In this example, the bundle has just two bounding vectors. In this example, if $p_{max,i}<o_i+T_{max}d_{i,min}$ then the distance check fails.

As another example, for an AllHit test, if $p_{min,i}>o_i$ then the distance check can determine, for each of the $i^{th}$ components, which of the bounding vectors has the smallest value for its $i^{th}$ component (to thereby identify $d_{i,min}$) and then it can be determined whether $p_{min,i}>o_i+T_{max}d_{i,min}$. In this example, if $p_{min,i}>o_i+T_{max}d_{i,min}$ then the distance check fails. For an AllHit test, if $p_{max,i}<o_i$ then the distance check can determine, for each of the $i^{th}$ components, which of the bounding vectors has the largest value for its $i^{th}$ component (to thereby identify $d_{i,max}$) and then it can be determined whether $p_{max,i}<o_i+T_{max}d_{i,max}$. In this example, if $p_{max,i}<o_i+T_{max}d_{i,max}$ then the distance check fails. In the examples of the distance checks described above, if the distance check fails then it is determined that the intersection testing result is that the bundle of rays misses the box, without needing to perform edge tests on the silhouette edges of the box.

If either the distance check or the direction check is failed then the method passes from step S406 to step S408. In step S408 the intersection testing result is determined to be that the bundle of rays misses the box. This intersection testing result can be outputted from the testing block 311 to the results processor 313, without steps S410 to S416 being performed.

If the distance check and the direction check are passed then the method passes from step S406 to step S410.

The distance and direction checks are optional, i.e. in some examples steps S404 to S408 might not be performed. Performing the distance and direction checks (in steps S404 to S408) can provide a reduction in the number of edge tests that need to be performed on the silhouette edges, because some intersection testing results (i.e. misses) can be determined by the distance and direction checks without needing to perform the edge tests for the silhouette edges.

In step S410 the testing block 311 identifies the silhouette edges of the box from the perspective of the bundle of rays.

Steps S412 and S414 are performed for each of the silhouette edges identified in step S410.

In step S412 components of a vector are obtained providing a bound to the bundle of rays. The vector, of which components are obtained, is dependent upon a particular silhouette edge being tested, and components of different vectors may be obtained for different silhouette edges. The components of the vector may be "obtained" by determining (e.g. calculating) the components of the vector or by receiving (e.g. reading) the components of the vector. The vector may, or may not, be the same as a direction vector for one of the rays of the bundle. For example, the components of the vector may be obtained by identifying, from the direction vectors of the rays in the bundle of rays, a minimum component value and a maximum component value in each dimension, wherein said obtained components of the vector providing a bound to the bundle of rays are chosen from a set of component values comprising the identified minimum component value and the identified maximum component value in each dimension.

A vector may provide an external bound to a bundle of rays with respect to a silhouette edge in the sense that if it does not pass outside the identified silhouette edge then it is known that none of the rays of the bundle pass outside the silhouette edge. Furthermore, a vector may provide an internal bound to a bundle of rays with respect to a silhouette edge in the sense that if it does not pass inside the identified silhouette edge then it is known that none of the rays of the bundle pass inside the silhouette edge.

In step S414 the testing block 311 determines whether the vector obtained in step S412 passes inside or outside of the silhouette edge in question. This may be done as described above in relation to the testing of a single ray with respect to a box, e.g. in accordance with the inequality (11) given above. In examples described herein, for each of the silhouette edges, a single vector is obtained in step S412 and tested in step S414. The choice of which bounding vector to test with respect to each silhouette edge depends upon whether an AllHit test or an AnyHit test is being performed, as explained in more detail below.

In step S416, the results of determining, for each of the identified silhouette edges, whether the vector passes inside or outside of the silhouette edge, are used to determine an intersection testing result for the bundle of rays with respect to the box. For example, if the tests for all of the silhouette edges indicate that the respective vectors pass inside the respective silhouette edges then in step S416 the result of the bundle intersection test with respect to the box is determined to be a "hit" or a "pass"; whereas if the tests for one or more of the silhouette edges indicate that the respective vector passes outside the respective silhouette edge then in step S416 the result of the bundle intersection test with respect to the box is determined to be a "miss" or a "fail". For an AnyHit test, a "pass" or a "hit" result means that the test has not determined that all of the rays of the bundle miss the box, and a "fail" or "miss" results means that the test has determined that all of the rays of the bundle miss the box. For an AllHit test, a "pass" or a "hit" result means the test has determined that all of the rays of the bundle hit the box, and a "fail" or "miss" results means that the test has not determined that all of the rays of the bundle hit the box.

For example, the bundle intersection test may be an AllHit test (which may be referred to as an "AnyMiss test", e.g. if the outputs of the test were inversed). As described above, there are only two possible results from an AllHit test: either (i) the AllHit test determines that all of the rays of the bundle intersect the box, or (ii) the AllHit test does not determine that all of the rays of the bundle intersect the box. In this example, for each of the identified silhouette edges, the vector that is obtained in step S412 provides an external bound to the bundle of rays with respect to the identified silhouette edge. The vector provides an external bound to the bundle of rays with respect to the identified silhouette edge in the sense that if it does not pass outside the identified silhouette edge then it is known that none of the rays of the bundle pass outside the identified silhouette edge. As mentioned above, the vector may have either the maximum or the minimum component values of the ray direction vectors of the rays in the bundle in each dimension. Whether the maximum or minimum component value is chosen in each dimension depends upon the silhouette edge being tested and whether an internal bound or an external bound is being provided by the vector. The resulting vector may or may not be the same as the direction vector of one of the rays of the bundle.

If it is determined that, for each of the identified silhouette edges, the respective vector passes inside the identified silhouette edge, then the intersection testing result for the bundle of rays with respect to the box is that all of the rays in the bundle of rays intersect the box. If it is determined that, for one or more of the identified silhouette edges, the vector passes outside the respective identified silhouette edge, then the intersection testing result for the bundle of rays with respect to the box is not that all of the rays in the bundle of rays intersect the box, e.g. one or more of the rays of the bundle may miss the box.

For example, in the 2D example shown in FIG. 5, an AllHit test may be performed for the first bundle of rays 504 with respect to the 2D box 502. In a 2D example, the silhouette edges reduce down to just two silhouette points, denoted $510_1$ and $510_2$ in FIG. 5. With respect to silhouette point $510_1$, the vector $504_1$ is obtained (in step S412) for the bundle 504 because this vector $504_1$ provides an external bound to the bundle 504 with respect to the silhouette point $510_1$, i.e. if it does not pass outside the identified silhouette point $510_1$ then it is known that none of the rays of the bundle 504 pass outside the identified silhouette point $510_1$. It is determined in step S414 that the vector $504_1$ passes inside the silhouette point $510_1$. In particular, with respect to silhouette point $510_1$ it is determined in accordance with inequality (11) that $(p_{min,x}-o_x)d_{y,1} \leq (p_{max,y}-o_y)d_{x,1}$, where $p_{min,x}$ and $p_{max,y}$ are the x and y component values at point $510_1$, $o_x$ and $o_y$ are the x and y component values of the origin of the bundle of rays 504, and $d_{x,1}$ and $d_{y,1}$ are the x and y component values of the direction of vector $504_1$. This single test determines that all of the rays of the ray bundle 504 pass inside the silhouette point $510_1$ of the box 502. With respect to silhouette point $510_2$, the vector $504_2$ is obtained (in step S412) for the bundle 504 because this vector $504_2$ provides an external bound to the bundle 504 with respect to the silhouette point $510_2$. It is determined in step S414 that the vector $504_2$ passes inside the silhouette point $510_2$. In particular, with respect to silhouette point $510_2$ it is determined in accordance with inequality (11) that $(p_{min,y}-o_y)d_{x,2} \leq (p_{max,x}-o_x)d_{y,2}$, where $p_{max,x}$ and $p_{min,y}$ are the x and y component values at point $510_2$, $o_x$ and $o_y$ are the x and y component values of the origin of the bundle of rays 504, and $d_{x,2}$ and $d_{y,2}$ are the x and y component values of the direction of vector $504_2$. This single test determines that all of the rays of the ray bundle 504 pass inside the silhouette point $510_2$ of the box 502. These two tests are sufficient to determine that all of the rays of the bundle 504 hit the box 502. Therefore, in step S416, it is determined that the result of the AllHit test for the bundle of rays 504 with respect to the box 502 is that all of the rays of the bundle 504 hit the box 502.

As another example, in the 2D example shown in FIG. 5, an AllHit test may be performed for the second bundle of rays 506 with respect to the 2D box 502. With respect to silhouette point $510_1$, the vector $506_1$ is obtained (in step S412) for the bundle 506 because this vector $506_1$ provides an external bound to the bundle 506 with respect to the silhouette point $510_1$. It is determined in step S414 that the vector $506_1$ passes inside the silhouette point $510_1$. In particular, with respect to silhouette point $510_1$ it is determined in accordance with inequality (11) that $(p_{min,x}-o_x)d_y, 1 \leq (p_{max,y}-o_y)d_{x,1}$, where $p_{min,x}$ and $p_{max,y}$ are the x and y component values at point $510_1$, $o_x$ and $o_y$ are the x and y component values of the origin of the bundle of rays 506, and $d_{x,1}$ and $d_{y,1}$ are the x and y component values of the direction of vector $506_1$. This single test determines that all of the rays of the ray bundle 506 pass inside the silhouette point $510_1$ of the box 502. With respect to silhouette point $510_2$, the vector $506_2$ is obtained (in step S412) for the bundle 506 because this vector $506_2$ provides an external bound to the bundle 506 with respect to the silhouette point $510_2$. It is determined in step S414 that the vector $506_2$ passes outside the silhouette point $510_2$. In particular, with respect to silhouette point $510_2$ it is determined that the bundle of rays 506 does not satisfy inequality (11). In other words, for the bundle of rays 506, it is not true that $(p_{min,y}-o_y)d_{x,2} \leq (p_{max,x}-o_x)d_{y,2}$, where $p_{max,x}$ and $p_{min,y}$ are the x and y component values at point $510_2$, $o_x$ and $o_y$ are the x and y component values of the origin of the bundle of rays 506, and $d_{x,2}$ and $d_{y,2}$ are the x and y component values of the direction of vector $506_2$. This test does not determine that all of the rays of the ray bundle 506 pass inside the silhouette point $510_2$ of the box 502. Therefore, in step S416, the result of the AllHit test for the bundle of rays 506 with respect to the box 502 is not that all of the rays of the bundle 506 hit the box 502. In other words, the AllHit test does not guarantee that all of the rays of the bundle 506 hit the box 502.

As another example, in the 2D example shown in FIG. 5, an AllHit test may be performed for the third bundle of rays 508 with respect to the 2D box 502. With respect to silhouette point $510_1$, the vector $508_1$ is obtained (in step S412) for the bundle 508 because this vector $508_1$ provides an external bound to the bundle 508 with respect to the silhouette point $510_1$. It is determined in step S414 that the vector $508_1$ passes inside the silhouette point $510_1$. In particular, with respect to silhouette point $510_1$ it is determined in accordance with inequality (11) that $(p_{min,x}-o_x)d_y, 1 \leq (p_{max,y}-o_y)d_{x,1}$, where $p_{min,x}$ and $p_{max,y}$ are the x and y component values at point $510_1$, $o_x$ and $o_y$ are the x and y component values of the origin of the bundle of rays 508, and $d_{x,1}$ and $d_{y,1}$ are the x and y component values of the direction of vector $508_1$. This single test determines that all of the rays of the ray bundle 508 pass inside the silhouette point $510_1$ of the box 502. With respect to silhouette point $510_2$, the vector $508_2$ is obtained (in step S412) for the bundle 508 because this vector $508_2$ provides an external bound to the bundle 508 with respect to the silhouette point $510_2$. It is determined in step S414 that the vector $508_2$ passes outside the silhouette point $510_2$. In particular, with respect to silhouette point $510_2$ it is determined that the bundle of rays 508 does not satisfy inequality (11). In other words, for the bundle of rays 508, it is not true that $(p_{min,y}-o_y)d_{x,2} \leq (p_{max,x}-o_x)d_{y,2}$, where $p_{max,x}$ and $p_{min,y}$ are the x and y component values at point $510_2$, $o_x$ and $o_y$ are the x and y component values of the origin of the bundle of rays 508, and $d_{x,2}$ and $d_{y,2}$ are the x and y component values of the direction of vector $508_2$. This test does not determine that all of the rays of the ray bundle 508 pass inside the silhouette point $510_2$ of the box 502. Therefore, in step S416, the result of the AllHit test for the bundle of rays 508 with respect to the box 502 is not that all of the rays of the bundle 508 hit the box 502. In other words, the AllHit test does not guarantee that all of the rays of the bundle 508 hit the box 502.

It can be seen that the result of the AllHit test is the same for bundles 506 and 508, i.e. it is not confirmed that all of the rays in either bundle 506 or 508 hits the box 502. This is the case even though some of the rays of bundle 508 do hit the box 502.

Figure 6:
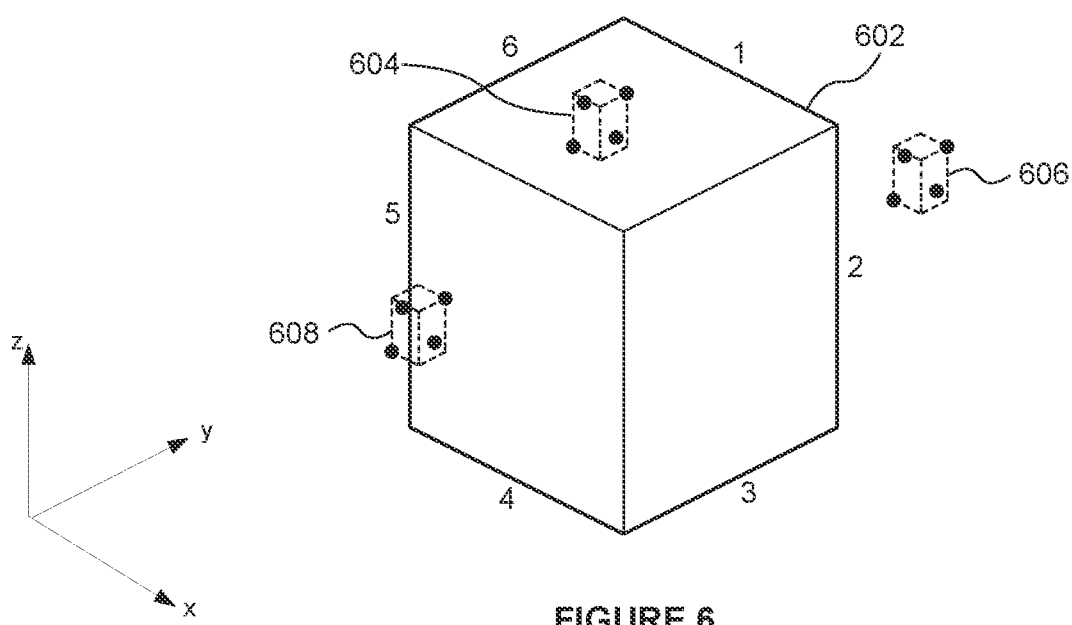
FIG. 6 shows three example bundles of rays to be tested for intersection with respect to a three dimensional box.

FIG. 6 shows a 3D example in which three bundles of rays (generally denoted 604, 606 and 608 in FIG. 6) are to be tested for intersection with a 3D box 602. FIG. 6 is drawn from the perspective of the origin of the rays. The first bundle of rays 604 comprises four rays (shown with the black circles in FIG. 6), and the dashed box represents an axis-aligned box bounding the bundle of rays 604, i.e. an axis-aligned box having minimum and maximum component values in each of the x, y and z dimensions equal to the minimum and maximum component values of the direction vectors of the rays in the bundle. The second bundle of rays 606 comprises four rays (shown with the black circles in FIG. 6), and the dashed box represents an axis-aligned box bounding the bundle of rays 606. The third bundle of rays 608 comprises four rays (shown with the black circles in FIG. 6), and the dashed box represents an axis-aligned box bounding the bundle of rays 608.

An AllHit test may be performed for the first bundle of rays 604 with respect to the 3D box 602. The box 602 has six silhouette edges, denoted 1 to 6 in FIG. 6. With respect to silhouette edge 1, components of a vector will be obtained which have the maximum y and z values of the direction vectors of the rays of the bundle 604. In this example, the top right ray shown in the bundle 604 is an example of a ray having these component values in the y and z directions. This vector provides an external bound to the bundle 604 with respect to the silhouette edge 1, i.e. if it does not pass outside the identified silhouette point $510_1$ then it is known that none of the rays of the bundle 604 pass outside the identified silhouette edge 1. It is determined in step S414 that the vector passes inside the silhouette edge 1. In particular, with respect to silhouette edge 1 it is determined in accordance with inequality (11) that $(p_{max,z}-o_z)d_y \leq (p_{max,y}-o_y)d_z$, where $p_{max,z}$ is the z component value of the plane on the top of the box 602, $p_{max,y}$ is the y component value of the plane at the back right of the box 602, $o_y$ and $o_z$ are the y and z component values of the origin of the bundle of rays 604, and $d_y$ and $d_z$ are the y and z component values of a vector defining the external bound of the bundle 604 with respect to silhouette edge 1. This single test determines that all of the rays of the ray bundle 604 pass inside silhouette edge 1 of the box 602. With respect to silhouette edge 6, components of a vector will be obtained which have the minimum x value and the maximum z value of the direction vectors of the rays of the bundle 604. A vector with these x and z components will provide an external bound to the bundle 604 with respect to silhouette edge 6. It is noted that in this example, no one of the four vectors in the bundle 604 has both the minimum x value and the maximum z value. It is determined in step S414 that a vector with the obtained x and z components passes inside silhouette edge 6. In particular, with respect to silhouette edge 6 it is determined in accordance with inequality (11) that $(p_{max,z}-o_z)d_x \leq (p_{min,x}-o_x)d_z$, where $p_{max,z}$ is the z component value of the plane on the top of the box 602, $p_{min,x}$ is the x component value of the plane at the back left of the box 602, $o_x$ and $o_z$ are the x and z component values of the origin of the bundle of rays 604, and $d_x$ and $d_z$ are the x and y component values of a vector defining the external bound of the bundle 604 with respect to silhouette edge 6. This single test determines that all of the rays of the ray bundle 604 pass inside silhouette edge 6 of the box 602. For brevity, we do not describe the tests of bundle 604 with silhouette edges 2 to 5, but it will be apparent from the description of the tests for silhouette edges 1 and 6 and from FIG. 6 that the AllHit test will determine that all of the rays of the bundle 604 are inside all of the silhouette edges of the box 602. Therefore, in step S416, it is determined that the result of the AllHit test for the bundle of rays 604 with respect to the box 602 is that all of the rays of the bundle 604 hit the box 602.

An AllHit test may be performed for the second bundle of rays 606 with respect to the 3D box 602. With respect to silhouette edge 2, components of a vector will be obtained which have the maximum x and y values of the direction vectors of the rays of the bundle 606. In this example, the top right ray shown in the bundle 606 is an example of a ray having these component values in the x and y directions. This vector provides an external bound to the bundle 606 with respect to the silhouette edge 2. It is determined in step S414 that the vector passes outside the silhouette edge 2. In particular, with respect to silhouette edge 2 inequality (11) is not satisfied, i.e. it is not the case that $(p_{max,x}-o_x)d_y \leq (p_{max,y}-o_y)d_x$, where $p_{max,x}$ is the x component value of the plane on the front right of the box 602, $p_{max,y}$ is the y component value of the plane at the back right of the box 602, $o_x$ and $o_y$ are the x and y component values of the origin of the bundle of rays 606, and $d_x$ and $d_y$ are the x and y component values of a vector defining the external bound of the bundle 606 with respect to silhouette edge 2. For brevity, we do not describe the tests of bundle 606 with respect to silhouette edges 1 or 3 to 6, but it will be apparent from FIG. 6 that the AllHit test will determine that all of the rays of the bundle 606 are inside the silhouette edges 3 to 6 of box 602, but that not all of the rays of the bundle 606 are inside silhouette edge 1. Therefore, in step S416, the result of the AllHit test for the bundle of rays 606 with respect to the box 602 is not a determination that all of the rays of the bundle 606 hit the box 602. It is noted that in some examples (e.g. implemented in software), the tests may be performed sequentially for the different silhouette edges, and in these examples, the result of the AllHit test could be determined as soon as the first "fail" or "miss" result is found for a silhouette edge (e.g. for silhouette edge 1 in the example given above in relation to the bundle 606), which may avoid having to test one or more other silhouette edges (e.g. silhouette edges 2-6). However, in other examples (e.g. implemented in hardware) the tests may be performed in parallel for the different silhouette edges.

Similarly, an AllHit test may be performed for the third bundle of rays 608 with respect to the 3D box 602. With respect to silhouette edge 5, components of a vector will be obtained which have the minimum x and y values of the direction vectors of the rays of the bundle 608. In this example, the bottom left ray shown in the bundle 608 is an example of a ray having these component values in the x and y directions. This vector provides an external bound to the bundle 608 with respect to the silhouette edge 5. It is determined in step S414 that the vector passes outside the silhouette edge 5. In particular, with respect to silhouette edge 5 inequality (11) is not satisfied, i.e. it is not the case that $(p_{min,y}-o_y)d_x \leq (p_{min,x}-o_x)d_y$, where $p_{min,x}$ is the x component value of the plane on the back left of the box 602, $p_{min,y}$ is the y component value of the plane at the front left of the box 602, $o_x$ and $o_y$ are the x and y component values of the origin of the bundle of rays 608, and $d_x$ and $d_y$ are the x and y component values of a vector defining the external bound of the bundle 608 with respect to silhouette edge 5. For brevity, we do not describe the tests of bundle 608 with respect to silhouette edges 1 to 4 or 6, but it will be apparent from FIG. 6 that the AllHit test will determine that all of the rays of the bundle 608 are inside the silhouette edges 1 to 4 and 6 of box 602. Due to the result of the test with respect to silhouette edge 5, in step S416, the result of the AllHit test for the bundle of rays 608 with respect to the box 602 is not a determination that all of the rays of the bundle 608 hit the box 602.

If the result of an AllHit test for a bundle of rays with respect to the box is not that all of the rays in the bundle of rays intersect the box (e.g. for bundles 506 and 508 with respect to box 502 and for bundles 606 and 608 with respect to box 602), then the method may further comprise determining whether any of the rays in the bundle of rays intersect the box.

As another example, the bundle intersection test may be an AnyHit test (which may be referred to as an "AllMiss test", e.g. if the outputs of the test were inversed). As described above, there are only two possible results from an AnyHit test: either (i) the AnyHit test determines that all of the rays of the bundle miss the box, or (ii) the AnyHit test does not determine that all of the rays of the bundle miss the box. In this example, for each of the identified silhouette edges, the vector that is obtained in step S412 provides an internal bound to the bundle of rays with respect to the identified silhouette edge. The vector provides an internal bound to the bundle of rays with respect to the identified silhouette edge in the sense that if it does not pass inside the identified silhouette edge then it is known that none of the rays of the bundle pass inside the identified silhouette edge. As mentioned above, the vector may have either the maximum or the minimum component values of the ray direction vectors of the rays in the bundle in each dimension. Whether the maximum or minimum component value is chosen in each dimension depends upon the silhouette edge being tested and whether an internal bound or an external bound is being provided by the vector. The resulting vector may or may not be the same as the direction vector of one of the rays of the bundle.

If it is determined that, for each of the identified silhouette edges, the respective vector passes inside the identified silhouette edge, then the intersection testing result for the bundle of rays with respect to the box is not that all of the rays in the bundle of rays miss the box. If it is determined that, for one or more of the identified silhouette edges, the vector passes outside the respective identified silhouette edge, then the intersection testing result for the bundle of rays with respect to the box is that all of the rays in the bundle of rays miss the box.

For example, in the 2D example shown in FIG. 5, an AnyHit test may be performed for the first bundle of rays 504 with respect to the 2D box 502. With respect to silhouette point $510_1$, the vector $504_2$ is obtained (in step S412) for the bundle 504 because this vector $504_2$ provides an internal bound to the bundle 504 with respect to the silhouette point $510_1$, i.e. if it does not pass inside the identified silhouette point $510_1$ then it is known that none of the rays of the bundle 504 pass inside the identified silhouette point $510_1$. It is determined in step S414 that the vector $504_2$ passes inside the silhouette point $510_1$. In particular, with respect to silhouette point $510_1$ it is determined in accordance with inequality (11) that $(p_{min,x}-o_x)d_{y,2} \leq (p_{max,y}-o_y)d_{x,2}$, where $p_{min,x}$ and $p_{max,y}$ are the x and y component values at point $510_1$, $o_x$ and $o_y$ are the x and y component values of the origin of the bundle of rays 504, and $d_{x,2}$ and $d_{y,2}$ are the x and y component values of the direction of vector $504_2$. With respect to silhouette point $510_2$, the vector $504_1$ is obtained (in step S412) for the bundle 504 because this vector $504_1$ provides an internal bound to the bundle 504 with respect to the silhouette point $510_2$. It is determined in step S414 that the vector $504_1$ passes inside the silhouette point $510_2$. In particular, with respect to silhouette point $510_2$ it is determined in accordance with inequality (11) that $(p_{min,y}-o_y)d_{x,1} \leq (p_{max,x}-o_x)d_{y,1}$, where $p_{max,x}$ and $p_{min,y}$ are the x and y component values at point $510_2$, $o_x$ and $o_y$ are the x and y component values of the origin of the bundle of rays 504, and $d_{x,1}$ and $d_{y,1}$ are the x and y component values of the direction of vector $504_1$. The results of these two tests are used to determine that not all of the rays of the bundle 504 miss the box 502. Therefore, in step S416, the result of the AnyHit test for the bundle of rays 504 with respect to the box 502 is not a determination that all of the rays of the bundle 504 miss the box 502, e.g. at least one of the rays of the bundle 504 may hit the box 502. In other words, the AnyHit test does not guarantee that all of the rays of the bundle 504 miss the box 502.

As another example, in the 2D example shown in FIG. 5, an AnyHit test may be performed for the second bundle of rays 506 with respect to the 2D box 502. With respect to silhouette point $510_1$, the vector $506_2$ is obtained (in step S412) for the bundle 506 because this vector $506_2$ provides an internal bound to the bundle 506 with respect to the silhouette point $510_1$. It is determined in step S414 that the vector $506_2$ passes inside the silhouette point $510_1$. In particular, with respect to silhouette point $510_1$ it is determined in accordance with inequality (11) that $(p_{min,x}-o_x)d_{y,2} \leq (p_{max,y}-o_y)d_{x,2}$, where $p_{min,x}$ and $p_{max,y}$ are the x and y component values at point $510_1$, $o_x$ and $o_y$ are the x and y component values of the origin of the bundle of rays 506, and $d_{x,2}$ and $d_{y,2}$ are the x and y component values of the direction of vector $506_2$. With respect to silhouette point $510_2$, the vector $506_1$ is obtained (in step S412) for the bundle 506 because this vector $506_1$ provides an internal bound to the bundle 506 with respect to the silhouette point $510_2$. It is determined in step S414 that the vector $506_1$ passes outside the silhouette point $510_2$. In particular, with respect to silhouette point $510_2$ it is determined that the bundle of rays 506 does not satisfy inequality (11). In other words, for the bundle of rays 506, it is not true that $(p_{min,y}-o_y)d_{x,1} \leq (p_{max,x}-o_x)d_{y,1}$, where $p_{max,x}$ and $p_{min,y}$ are the x and y component values at point $510_2$, $o_x$ and $o_y$ are the x and y component values of the origin of the bundle of rays 506, and $d_{x,1}$ and $d_{y,1}$ are the x and y component values of the direction of vector $506_1$. This single test determines that all of the rays of the ray bundle 506 pass outside the silhouette point $510_2$ of the box 502. Therefore, in step S416, the result of the AnyHit test for the bundle of rays 506 with respect to the box 502 is that all of the rays of the bundle 506 miss the box 502.

As another example, in the 2D example shown in FIG. 5, an AnyHit test may be performed for the third bundle of rays 508 with respect to the 2D box 502. With respect to silhouette point $510_1$, the vector $508_2$ is obtained (in step S412) for the bundle 508 because this vector $508_2$ provides an internal bound to the bundle 508 with respect to the silhouette point $510_1$. It is determined in step S414 that the vector $508_2$ passes inside the silhouette point $510_1$. In particular, with respect to silhouette point $510_1$ it is determined in accordance with inequality (11) that $(p_{min,x}-o_x)d_{y,2} \leq (p_{max,y}-o_y)d_{x,2}$, where $p_{min,x}$ and $p_{max,y}$ are the x and y component values at point $510_1$, $o_x$ and $o_y$ are the x and y component values of the origin of the bundle of rays 508, and $d_{x,2}$ and $d_{y,2}$ are the x and y component values of the direction of vector $508_2$. With respect to silhouette point $510_2$, the vector $508_1$ is obtained (in step S412) for the bundle 508 because this vector $508_1$ provides an internal bound to the bundle 508 with respect to the silhouette point $510_2$. It is determined in step S414 that the vector $508_1$ passes inside the silhouette point $510_2$. In particular, with respect to silhouette point $510_2$ it is determined in accordance with inequality (11) that $(p_{min,y}-o_y)d_{x,1} \leq (p_{max,x}-o_x)d_{y,1}$, where $p_{max,x}$ and $p_{min,y}$ are the x and y component values at point $510_2$, $o_x$ and $o_y$ are the x and y component values of the origin of the bundle of rays 508, and $d_{x,1}$ and $d_{y,1}$ are the x and y component values of the direction of vector $508_1$. Therefore, in step S416, the result of the AnyHit test for the bundle of rays 508 with respect to the box 502 is not that all of the rays of the bundle 508 miss the box 502, e.g. at least one of the rays of the bundle 508 may hit the box 502. In other words, the AnyHit test does not guarantee that all of the rays of the bundle 508 miss the box 502.

It can be seen that the result of the AnyHit test is the same for bundles 504 and 508, i.e. it is not confirmed that all of the rays in either bundle 504 or 508 miss the box 502. This is the case even though some of the rays of bundle 508 do not hit the box 502.

With reference to the 3D example shown in FIG. 6, an AnyHit test may be performed for the first bundle of rays 604 with respect to the 3D box 602. With respect to silhouette edge 1, components of a vector will be obtained which have the minimum y and z values of the direction vectors of the rays of the bundle 604. In this example, the bottom left ray shown in the bundle 604 is an example of a ray having these component values in the y and z directions. This vector provides an internal bound to the bundle 604 with respect to the silhouette edge 1. It is determined in step S414 that the vector passes inside the silhouette edge 1. In particular, with respect to silhouette edge 1 it is determined in accordance with inequality (11) that $(p_{max,z}-o_z)d_y \leq (p_{max,y}-o_y)d_z$, where $p_{max,z}$ is the z component value of the plane on the top of the box 602, $p_{max,y}$ is the y component value of the plane at the back right of the box 602, $o_y$ and $o_z$ are the y and z component values of the origin of the bundle of rays 604, and $d_y$ and $d_z$ are the y and z component values of a vector defining the internal bound of the bundle 604 with respect to silhouette edge 1. With respect to silhouette edge 6, components of a vector will be obtained which have the maximum x value and the minimum z value of the direction vectors of the rays of the bundle 604. A vector with these x and z components will provide an internal bound to the bundle 604 with respect to silhouette edge 6. It is noted that in this example, no one of the four vectors in the bundle 604 has both the maximum x value and the minimum z value. It is determined in step S414 that a vector with the obtained x and z components passes inside silhouette edge 6. In particular, with respect to silhouette edge 6 it is determined in accordance with inequality (11) that $(p_{max,z}-o_z)d_x \leq (p_{min,x}-o_x)d_z$, where $p_{max,z}$ is the z component value of the plane on the top of the box 602, $p_{min,x}$ is the x component value of the plane at the back left of the box 602, $o_x$ and $o_z$ are the x and z component values of the origin of the bundle of rays 604, and $d_x$ and $d_z$ are the x and y component values of a vector defining the internal bound of the bundle 604 with respect to silhouette edge 6. For brevity, we do not describe the tests of bundle 604 with respect to silhouette edges 2 to 5, but it will be apparent from the description of the tests for silhouette edges 1 and 6 and from FIG. 6 that the AnyHit test will determine that the bundle 604 of rays is inside all of the silhouette edges of the box 602. Therefore, in step S416, the result of the AnyHit test for the bundle of rays 604 with respect to the box 602 is not a determination that all of the rays of the bundle 604 miss the box 602, e.g. one or more of the rays of the bundle 604 may hit the box 602.

An AnyHit test may be performed for the second bundle of rays 606 with respect to the 3D box 602. With respect to silhouette edge 2, components of a vector will be obtained which have the minimum x and y values of the direction vectors of the rays of the bundle 606. In this example, the bottom left ray shown in the bundle 606 is an example of a ray having these component values in the x and y directions. This vector provides an internal bound to the bundle 606 with respect to the silhouette edge 2. It is determined in step S414 that the vector passes outside the silhouette edge 2. In particular, with respect to silhouette edge 2 inequality (11) is not satisfied, i.e. it is not the case that $(p_{max,x}-o_x)d_y \leq (p_{max,y}-o_y)d_x$, where $p_{max,x}$ is the x component value of the plane on the front right of the box 602, $p_{max,y}$ is the y component value of the plane at the back right of the box 602, $o_x$ and $o_y$ are the x and y component values of the origin of the bundle of rays 606, and $d_x$ and $d_y$ are the x and y component values of a vector defining the internal bound of the bundle 606 with respect to silhouette edge 2. This single test determines that all of the rays of the ray bundle 606 pass outside silhouette edge 2 of the box 602. For brevity, we do not describe the tests of bundle 606 with respect to silhouette edges 1 or 3 to 6, but it will be apparent from FIG. 6 that the AnyHit test will determine that the bundle 606 is inside the silhouette edges 1 and 3 to 6 of box 602. Due to the result of the test with respect to silhouette edge 2, in step S416, the result of the AnyHit test for the bundle of rays 606 with respect to the box 602 is a determination that all of the rays of the bundle 606 miss the box 602.

An AnyHit test may be performed for the third bundle of rays 608 with respect to the 3D box 602. With respect to silhouette edge 5, components of a vector will be obtained which have the maximum x and y values of the direction vectors of the rays of the bundle 608. In this example, the top right ray shown in the bundle 608 is an example of a ray having these component values in the x and y directions. This vector provides an internal bound to the bundle 608 with respect to the silhouette edge 5. It is determined in step S414 that the vector passes inside the silhouette edge 5. In particular, with respect to silhouette edge 5 inequality (11) is satisfied, i.e. it is the case that $(p_{min,y}-o_y)d_x \leq (p_{min,x}-o_x)d_y$, where $p_{min,x}$ is the x component value of the plane on the back left of the box 602, $p_{min,y}$ is the y component value of the plane at the front left of the box 602, $o_x$ and $o_y$ are the x and y component values of the origin of the bundle of rays 608, and $d_x$ and $d_y$ are the x and y component values of a vector defining the internal bound of the bundle 608 with respect to silhouette edge 5. For brevity, we do not describe the tests of bundle 608 with respect to silhouette edges 1 to 4 or 6, but it will be apparent from FIG. 6 that the AnyHit test will determine that the bundle 608 is inside the silhouette edges 1 to 4 and 6 of box 602. Therefore, in step S416, the result of the AnyHit test for the bundle of rays 608 with respect to the box 602 is not a determination that all of the rays of the bundle 608 miss the box 602, e.g. one or more rays of the bundle 608 may hit the box 602.

If the intersection testing result of an AnyHit test for a bundle of rays with respect to a box is not that all of the rays in the bundle of rays miss the box, then the method may further comprise determining which of the rays in the bundle of rays intersect the box. Alternatively, if the intersection testing result of an AnyHit test for a bundle of rays with respect to a box corresponding to a parent node in a hierarchical acceleration structure is not that all of the rays in the bundle of rays miss the box, then the method may further comprise performing an AnyHit test on a box corresponding to a child node, i.e. a node which is a child of the parent node in the hierarchical acceleration structure.

In some examples, in which a hierarchical acceleration structure is being traversed, a bundle of rays can be tested against a box corresponding to a root node of the acceleration structure using an AnyHit test. If the result of the AnyHit test for the bundle is a "hit", which may be referred to as a "pass", (i.e. if the result of the AnyHit test does not indicate that all of the rays in the bundle miss the box) then the bundle can be tested against boxes corresponding to each of the nodes which are children of the node in the acceleration structure for which an intersection was found for the bundle. This process continues down through levels of the acceleration structure. If the bundle does not pass the AnyHit test (i.e. the AnyHit test determines that all of the rays of the bundle miss a box) then the bundle is not tested against boxes corresponding to nodes which are the children of the node for which the AnyHit test returned a "miss" or "fail". If any of the rays in a bundle would hit a box then the whole bundle is pulled down for testing at the next lower level of the acceleration structure. As the bundle gets deeper in the hierarchical acceleration structure (i.e. as the bundle is tested against lower levels of the acceleration structure), the boxes against which the bundle is tested become smaller, and the chance of rays being unnecessarily involved in intersection testing against boxes which they miss increases. Therefore, there may be a threshold level in the hierarchical acceleration structure such that below the threshold level, if a bundle passes an AnyHit test at the threshold level then the bundle will be split up into individual rays for testing against boxes corresponding to nodes at the level below the threshold level. The threshold level could be different in different examples, and to give two examples, the threshold level could be based on the node depth in the hierarchical acceleration structure, or based on the size of the bounding box being tested. If a bundle of rays passes an AnyHit test against a leaf node then the rays of the bundle may be split up from the bundle and the individual rays may be tested for intersection with the primitive(s) which are pointed to by the pointers of the leaf node. Alternatively, the bundles could be tested for intersection with the primitives which are pointed to by the pointers of the leaf node. The system may comprise different testing blocks for testing rays against primitives rather than for testing rays against boxes. It is noted that primitives would not normally be rectangular or cuboidal in shape (primitives are often triangular).

In the examples described above, all of the rays of a bundle of rays have the same origin. This helps to simplify the intersection testing performed on the bundles of rays. However, if bundles can only include rays which have the same origin, this places a significant restriction on which rays can be grouped together to form bundles, meaning that some rays might not be able to be grouped together into a bundle. Primary rays often have the same origin (i.e. corresponding a viewpoint from which the scene is being viewed). However, secondary rays (i.e. rays emitted from an intersection point in the scene) often have different origins. Allowing rays which have different origins to be grouped together into a bundle may increase the number of rays (particularly secondary rays) which can be grouped together into bundles. Methods of grouping rays together into bundles are described in more detail below with reference to FIG. 10. In some examples, it is not the case that all of the rays of a bundle of rays have the same origin. For example, the rays within a bundle of rays can have different origins. There may be a threshold difference to the origins above which rays will not be included in the same bundle. In these examples, even though the origins of the rays within a bundle might not all be exactly the same, the differences between the origins of the rays in the bundle is not large. This allows intersection testing to be performed for the bundle whilst still providing useful results with respect to the rays of the bundle.

For example, data for a bundle may specify the maximum and minimum ray origin component values in each dimension of the rays within the bundle. For example, vectors $o_{min}$ and $o_{max}$ may be specified, wherein the x, y and z components of $o_{min}$ are the minimum of the x, y and z component values of the origins of the rays in the bundle, and wherein the x, y and z components of $o_{max}$ are the maximum of the x, y and z component values of the origins of the rays in the bundle. When computing the distance from the ray origin to a plane representing a side of a box in the intersection testing process, either the distance to the minimum origin or the maximum origin for the bundle in a particular dimension is used. The choice of whether to use the minimum or the maximum components of the origins of the rays of the bundle in the intersection testing depends upon whether an AllHit test or an AnyHit test is being performed.

For example, for an AnyHit test, it is better to err on the side of producing a hit result (i.e. a pass, which indicates that it is not the case that all of the rays in the bundle miss a box) rather than a miss result (i.e. a fail, which indicates that all of the rays in the bundle miss the box). This is because if an AnyHit test produces a false miss result (i.e. a miss result when actually one or more of the rays of the bundle hits the box) this can cause rendering errors; whereas if an AnyHit test produces a false hit result (i.e. a hit result when actually all of the rays of the bundle miss the box) this will not cause rendering errors but could reduce the efficiency of the intersection testing, e.g. by meaning that further intersection tests are unnecessarily performed. Therefore, the effective size of the box is increased such that where the origin component values are being subtracted from a minimum plane of the box, the maximum origin component value is used, i.e. where a value of $(p_{min,i}-o_i)$ is used in the examples given above this would be replaced by a value of $(p_{min,i}-o_{max,i})$ for $i \in \{x,y,z\}$ where $o_{max,i}$ is the maximum of the $i^{th}$ components of the origins of the rays of the bundle. Furthermore, to increase the effective size of the box, where the origin component values are being subtracted from a maximum plane of the box, the minimum origin component value is used, i.e. where a value of $(p_{max,i}-o_i)$ is used in the examples given above this would be replaced by a value of $(p_{max,i}-o_{min,i})$ for $i \in \{x,y,z\}$ where $o_{min,i}$ is the minimum of the $i^{th}$ components of the origins of the rays of the bundle.

For example, for an AllHit test, it may be better to err on the side of producing a miss result (i.e. fail, which indicates that it is not the case that all of the rays in the bundle hit a box) rather than a hit result (i.e. a pass, which indicates that all of the rays in the bundle hit the box). This is because if an AllHit test produces a false hit result (i.e. a hit result when actually one or more of the rays of the bundle misses the box) this may cause a significant decrease in the efficiency of the intersection testing; whereas if an AllHit test produces a false miss result (i.e. a miss result when actually all of the rays of the bundle hit the box) this may produce a less significant decrease in the efficiency of the intersection testing. Therefore, the effective size of the box may be decreased such that where the origin component values are being subtracted from a minimum plane of the box, the minimum origin component value is used, i.e. where a value of $(p_{min,i}-o_i)$ is used in the examples given above this may be replaced by a value of $(p_{min,i}-o_{min,i})$ for $i \in \{x,y,z\}$ where $o_{min,i}$ is the minimum of the $i^{th}$ components of the origins of the rays of the bundle. Furthermore, to decrease the effective size of the box, where the origin component values are being subtracted from a maximum plane of the box, the maximum origin component value is used, i.e. where a value of ($p_{max,i}$–$o_i$) is used in the examples given above this would be replaced by a value of ($p_{max,i}$–$o_{max,i}$) for i∈{x,y,z} where $o_{max,i}$ is the maximum of the $i^{th}$ components of the origins of the rays of the bundle.

Figure 16A:
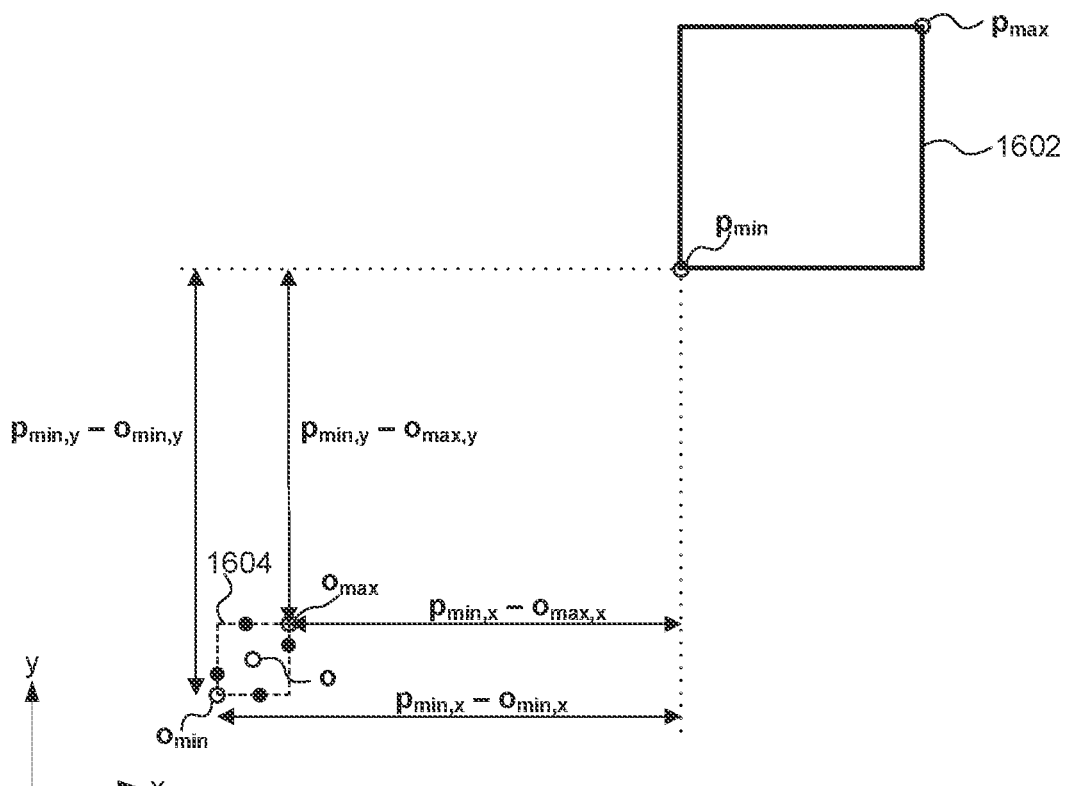
FIG. 16a illustrates a bundle of rays with differing origins to be tested for intersection with respect to a box in a 2D example.
Figure 16B:
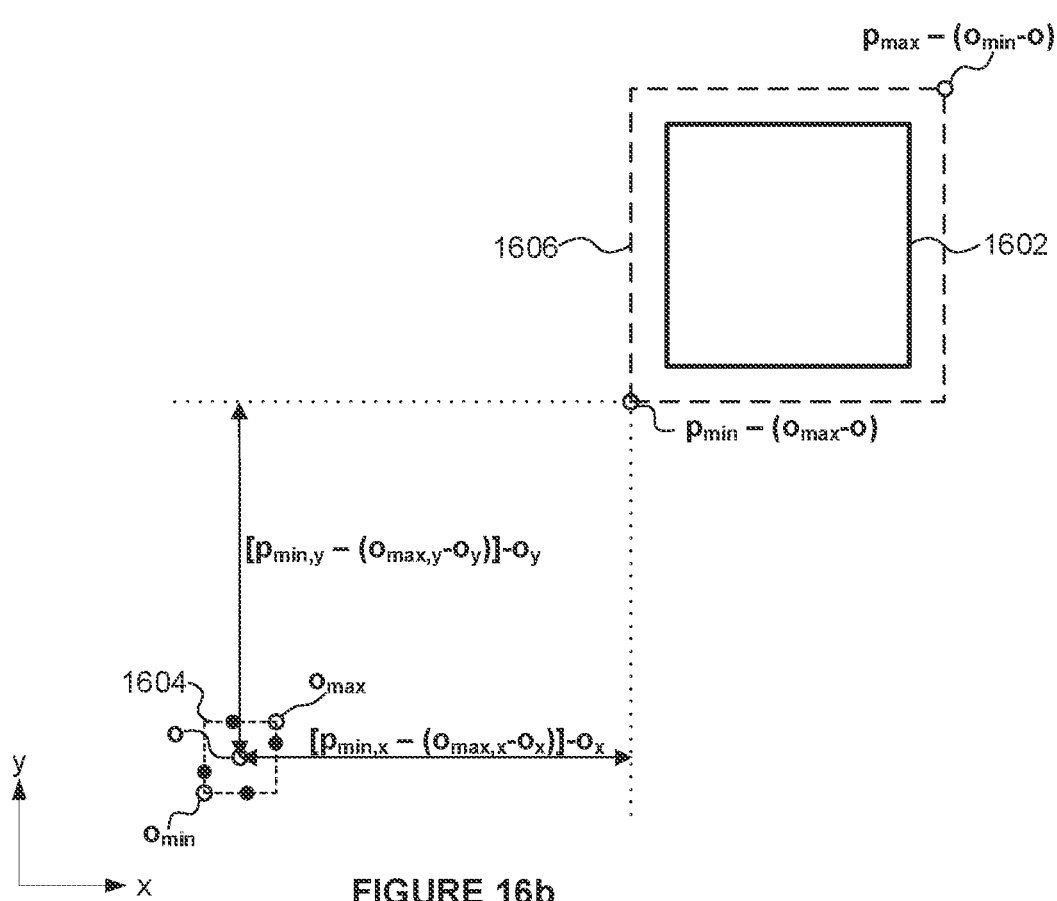
FIG. 16b illustrates the bundle of rays shown in FIG. 16a being tested in an AnyHit test for intersection with respect to the box by increasing the effective size of the box.
Figure 16C:
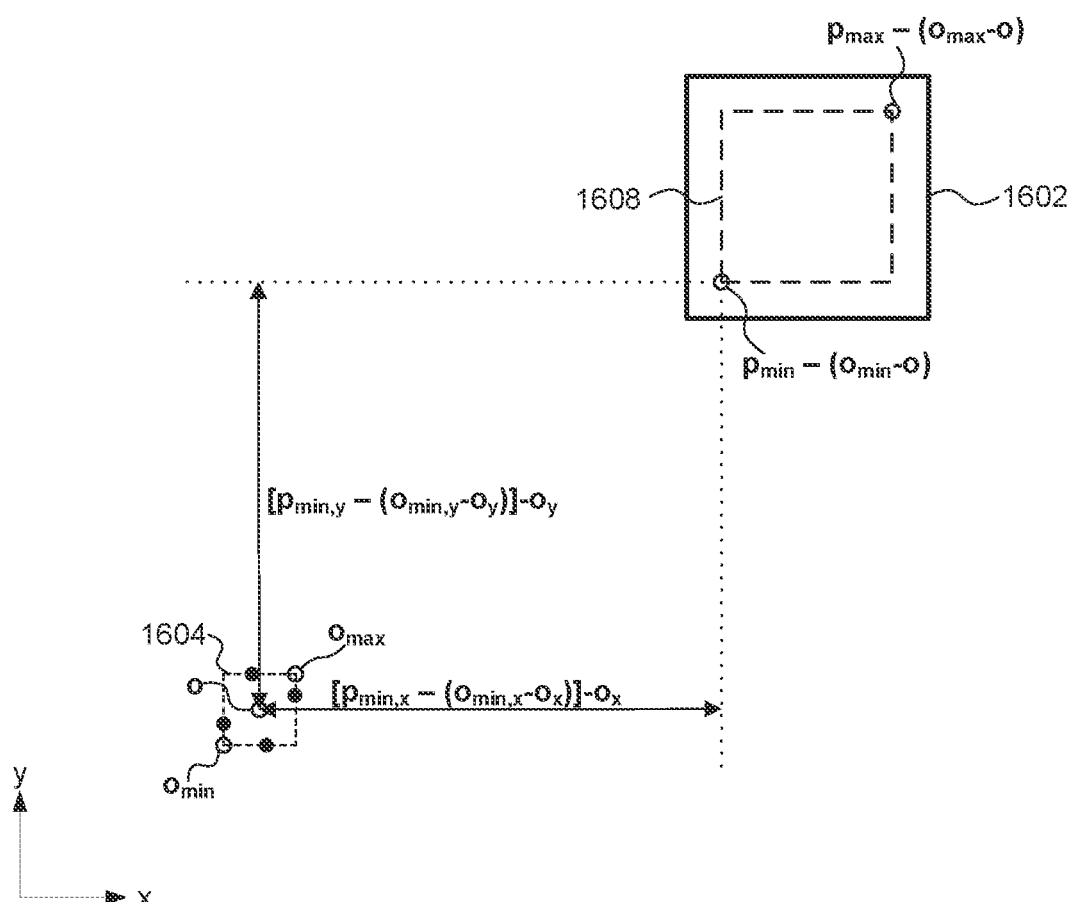
FIG. 16c illustrates the bundle of rays shown in FIG. 16a being tested in an AllHit test for intersection with respect to the box by decreasing the effective size of the box.

FIGS. 16a to 16c illustrate how the effective size of a box can be increased or decreased based on the differences in origin values of the rays in a bundle. For ease of illustration, the examples shown in FIGS. 16a to 16c is a 2D example, but it will be apparent how the effective size of a box can be increased or decreases in a 3D example too. FIG. 16a shows a box 1602 with the minimum position vector $p_{min}$ and the maximum position vector $p_{max}$ being shown. In this example, the bundle of rays includes four rays, which have origins at the positions shown by the solid black circles in FIG. 16a. The axis aligned bounding box 1604 bounds all of the origins. The bounding box 1604 has a maximum position vector $o_{max}$ and a minimum position vector $o_{min}$ as shown in FIG. 16a. Distances between $p_{min}$ and $o_{max}$ and $o_{min}$ in the x and y directions are illustrated in FIG. 16a.

FIG. 16b illustrates how, in the example of an AnyHit test, the effective size of the box 1602 can be increased based on the differences in the origin values of the rays in the bundle. The bundle of rays can be treated as if it had a single origin at position o. The effective size of the box 1602 is increased to be the box 1606 as shown with the dashed lines in FIG. 16b. The minimum position vector of the effective box 1606 is at a position [$p_{min}$–($o_{max}$–o)], and the maximum position vector of the effective box 1606 is at a position [$p_{max}$–($o_{min}$–o)]. The distance to the minimum vector position of the effective box 1606, in the x dimension, is given by [$p_{min,x}$–($o_{max,x}$–$o_x$)]–$o_x$ which is the same as [$p_{min,x}$–$o_{max,x}$] illustrated in FIG. 16a; and the distance to the minimum vector position of the effective box 1606, in the y dimension, is given by [$p_{min,y}$–($o_{max,y}$–$o_y$)]–$o_y$ which is the same as [$p_{min,y}$–$o_{max,y}$] illustrated in FIG. 16a. Similarly calculations can be made for determining the distance between the bundle of rays and the maximum vector position of the effective box 1606. It can be appreciated that, in the AnyHit example, increasing the effective size of the box 1602 to be the box 1606 and using a single origin value is equivalent to treating the bundle of rays as having different origin values to be tested against the original box 1602.

FIG. 16c illustrates how, in the example of an AllHit test, the effective size of the box 1602 can be decreased based on the differences in the origin values of the rays in the bundle. In particular, the effective size of the box 1602 is decreased to be the box 1608 as shown with the dashed lines in FIG. 16c. The minimum position vector of the effective box 1608 is at a position [$p_{min}$–($o_{min}$–o)], and the maximum position vector of the effective box 1608 is at a position [$p_{max}$–($o_{max}$–o)]. The bundle of rays can be treated as if it had a single origin at position o, and the distance to the minimum vector position of the effective box 1608, in the x dimension, is given by [$p_{min,x}$–($o_{min,x}$–$o_x$)]–$o_x$ which is the same as [$p_{min,x}$–$o_{min,x}$] illustrated in FIG. 16a; and the distance to the minimum vector position of the effective box 1608, in the y dimension, is given by [$p_{min,y}$–($o_{min,y}$–$o_y$)]–$o_y$ which is the same as [$p_{min,y}$–$o_{min,y}$] illustrated in FIG. 16a. Similarly calculations can be made for determining the distance between the bundle of rays and the maximum vector position of the effective box 1608. It can be appreciated that, in the AllHit example, decreasing the effective size of the box 1602 to be the box 1608 and using a single origin value is equivalent to treating the bundle of rays as having different origin values to be tested against the original box 1602.

Therefore, if the rays in a bundle do not all have the same origin, for each of the identified silhouette edges, step S414 of determining whether the vector passes inside or outside of the silhouette edge comprises performing a comparison in accordance with ($p_{o,i}$–$o_{i,[min,max]}$)$d_j$<($p_{o,j}$–$o_{j,[min,max]}$)$d_i$, wherein $p_{o,i}$ is the $i^{th}$ component of a point on a first plane representing a first of the sides of the box which forms the silhouette edge, $p_{o,j}$ is the $j^{th}$ component of a point on a second plane representing a second of the sides of the box which forms the silhouette edge, $o_{i[min,max]}$ is either the minimum or the maximum of the $i^{th}$ components of the origins of the rays of the bundle of rays, $o_{j[min,max]}$ is either the minimum or the maximum of the $j^{th}$ components of the origins of the rays of the bundle of rays, and $d_i$ and $d_j$ are the obtained $i^{th}$ and $j^{th}$ components of the vector providing a bound to the bundle of rays.

In the examples described above and shown in FIGS. 5 and 6, the direction vectors of the rays in a bundle all have the same sign. In these examples, the silhouette edges of the box are at opposing edges of the box. However, if the direction vectors of the rays in a bundle do not all have the same sign for one or more of their component values, then the step of identifying the silhouette edges (step S410) may identify different edges of the box. For example, FIG. 7 shows a 2D example in which a bundle of rays 704 is to be tested for intersection with the 2D box 702. The two bounding vectors $704_1$ and $704_2$ for the bundle 704 have different signs in their x component values, but their y component values have the same sign. In some examples, the rays are grouped into ray bundles with the requirement that, in each dimension, the component values of the bounding vectors have the same signs, but in other examples this is not a requirement for grouping rays together into a bundle. As shown in FIG. 7, in this example, the silhouette points of the 2D box 702 are $710_1$ and $710_2$. These two silhouette points both lie on the edge of the box 702 that is closest to the origin of the bundle of rays 704. Therefore, the silhouette points $710_1$ and $710_2$ are not at diametrically opposed corners of the box 702. As an example, an AllHit test performed on the bundle 704 with respect to the box 702 will determine that all of the rays of the bundle 704 hit the box 702 because vector $704_1$ passes inside silhouette point $710_1$ and because vector $704_2$ passes inside silhouette point $710_2$. It is apparent from FIG. 7 that if diametrically opposed points of the box 702 were used as the silhouette points of the box then an AllHit test performed on the bundle 704 with respect to the box 702 would not determine that all of the rays of the bundle 704 hit the box 702.

FIG. 8a shows a 3D example in which, due to the perspective from which a box 802 is being viewed the silhouette edges (denoted 1 to 6 in FIG. 8a) are not all in diametrically opposed pairs. For example, the edges diametrically opposed to silhouette edges 2, 3, 5 and 6 are not silhouette edges of the box 802 when viewed from the perspective shown in FIG. 8a. FIG. 8b shows a 3D example in which, due to the perspective from which a box 804 is being viewed there are only four silhouette edges (denoted 1 to 4 in FIG. 8b) which are not diametrically opposed edges of the box 804. It is noted that the box 804 is a 3D box, but from the perspective shown in FIG. 8b only one side of the box 804 can be seen such that the edges of this one side of the box 804 are the silhouette edges of the 3D box 804 when viewed from the perspective shown in FIG. 8b.

Figure 9:
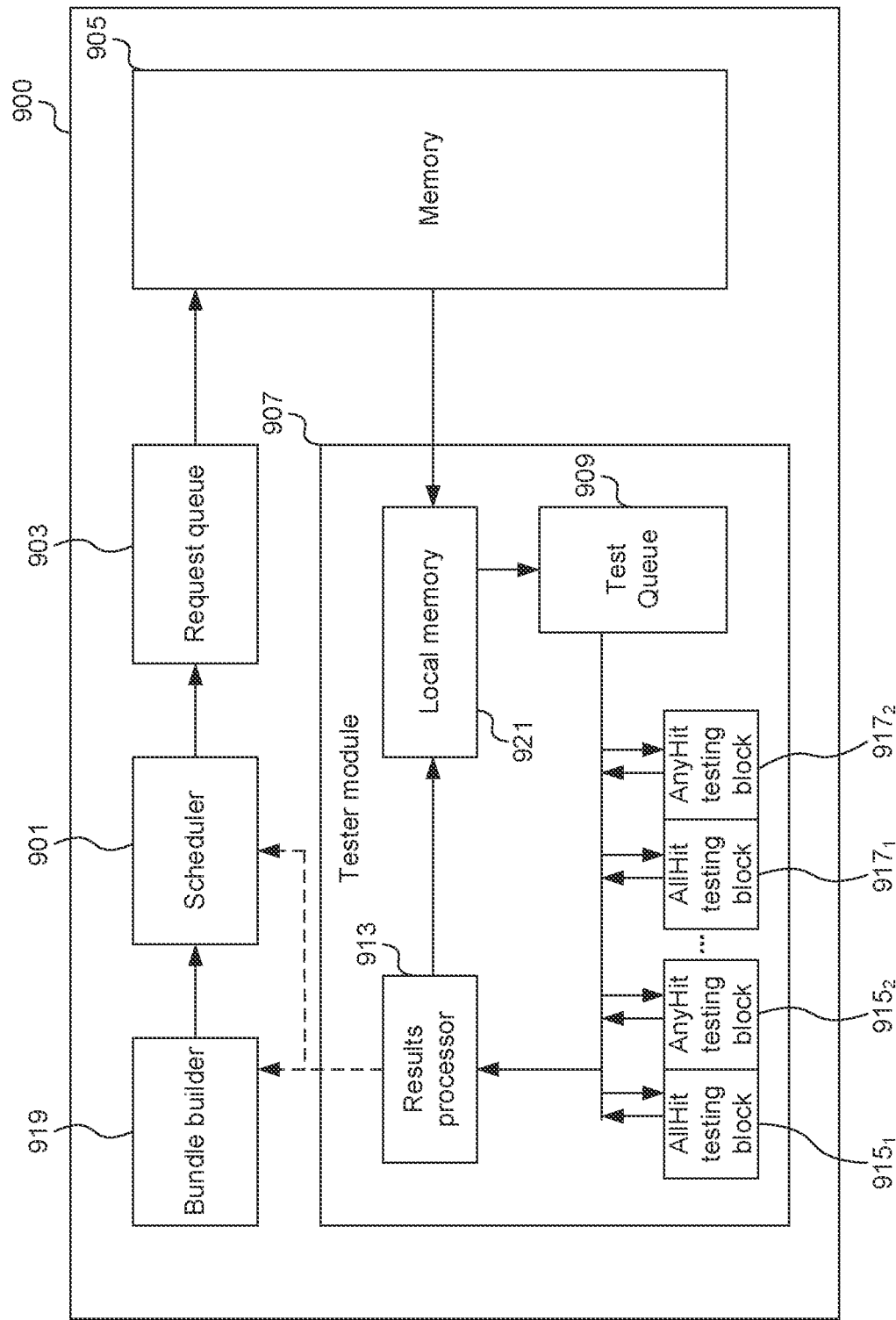
FIG. 9 shows a second example ray tracing system.

FIG. 9 shows another example ray tracing system 900 for performing intersection testing in the manner described above. Ray tracing system 900 is similar to ray tracing system 300 in that it comprises a scheduler 901, request queue 903, memory 905 and a tester module 907, and in that the tester module 907 comprises a test queue 909 and a results processor 913. The tester module 907 also comprises a set of one or more first testing blocks (configured to perform AllHit bundle intersection tests), and a set of one or more second testing blocks (configured to perform AnyHit bundle intersection tests). The testing blocks are organised into pairs of testing blocks, each pair of testing blocks comprising: (i) one first testing block from the set of one or more first testing blocks, and (ii) one second testing block from the set of one or more second testing blocks. For example, FIG. 9 shows a first pair of testing blocks comprising an AllHit testing block $915_1$ and an AnyHit testing block $915_2$; and a second pair of testing blocks comprising an AllHit testing block $917_1$ and an AnyHit testing block $917_2$. The results processor 913 is configured to process the intersection testing results determined by the testing blocks.

The ray tracing system 900 also comprises a bundle builder (e.g. implemented in hardware or software, or a combination thereof) which is configured to receive rays and construct bundles of rays from the received rays to be tested for intersection with a box. The bundles may be constructed by grouping rays together based on their similarity. The term "similarity" used here refers to whether rays have similar origins and directions. That is, rays that have similar origins and similar directions are "similar" rays. The bundle builder groups similar rays into bundles so that bundle intersection tests can be performed on the bundles. Furthermore, it is noted that the scheduler 901 groups coherent rays and/or bundles into packets. Here the term "coherent" means that the rays and/or bundles will access the same memory location for retrieving nodes to be tested against for intersection. "Similar" rays which are grouped into a bundle are also "coherent" rays because these similar rays will access the same memory location for intersection testing. However, "coherent" rays are not necessarily "similar". In other words, some rays which will access the same memory location for retrieving nodes to be tested against for intersection might not have similar origins and directions. The way in which the bundle builder 919 groups rays into bundles may be controlled by a similarity threshold, e.g. by allowing new rays to merge with a bundle if the solid angle representing the bounding vectors of the bundle is kept below a threshold, and/or as another example, by keeping the bounding box of the origins of the rays within a bundle below a certain size. This size threshold could be relative to the size of the scene. Alternatively, a simpler direction threshold would be to say, for each of the i components, the range of the $i^{th}$ component values for the direction vectors of the rays in a bundle has a maximum value. In other words, a value of $d_{max,i} - d_{min,i}$ for each of the i components, has a maximum value. In this example, the direction vectors are normalised so that they are comparable.

Figure 10:
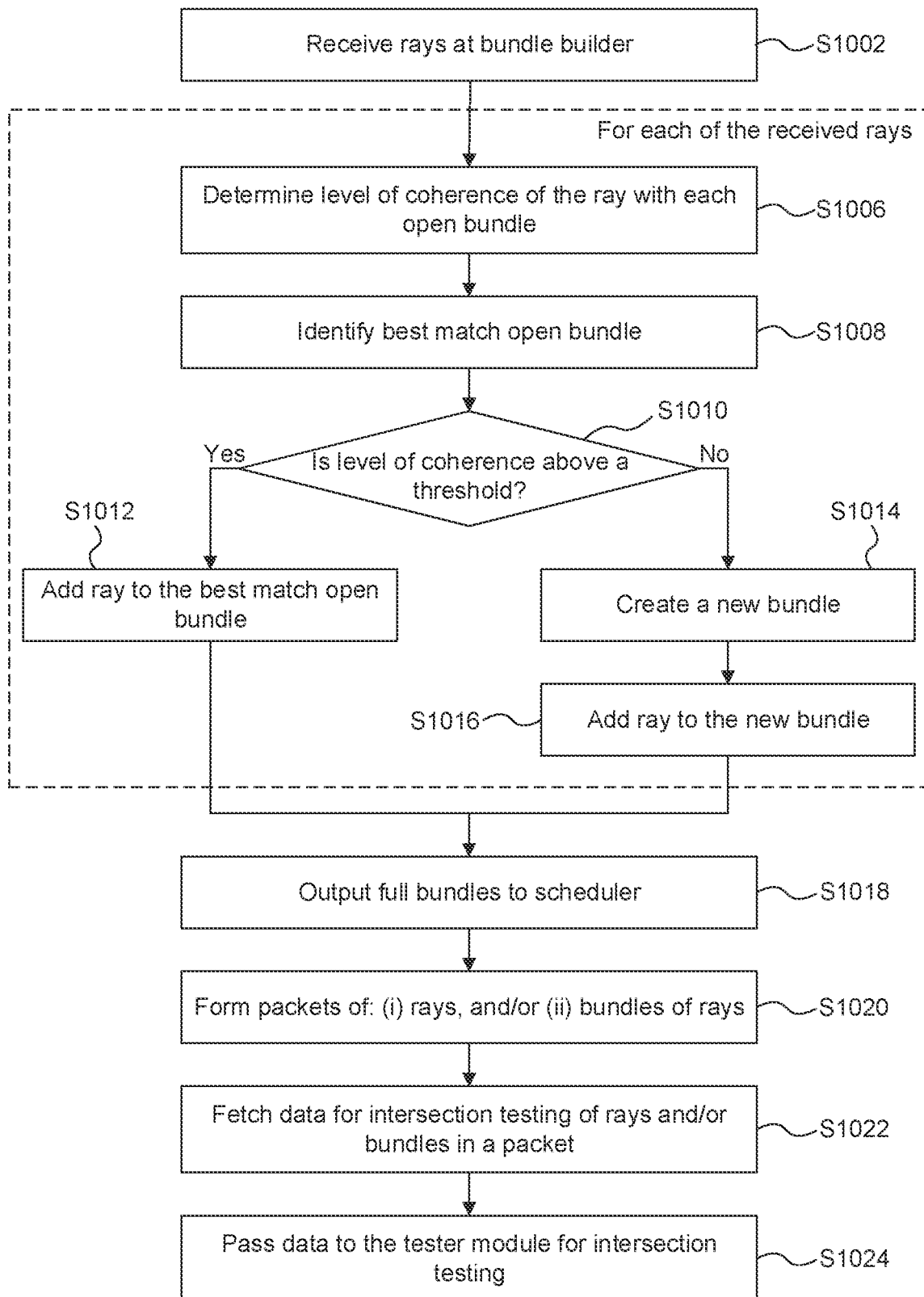
FIG. 10 is a flow chart for a method of processing rays to be tested for intersection in a ray tracing system.

FIG. 10 shows a flow chart for a method performed by the ray tracing system 900. In step S1002, the bundle builder 919 receives rays to be tested for intersection with one or more boxes. The bundle builder 919 may maintain a set of open bundles to which the received rays can be added. The bundle builder 919 may have some local memory in order to store the open bundles. Steps S1006 to S1016 are performed for each of the received rays. In step S1006, the bundle builder 919 determines a level of similarity of a received ray with each of the open bundles. This can be done by, for each of the open bundles, seeing how much, if at all, the bundle bounds were to grow if the ray was added to the bundle. For example, if the origin of the ray is outside the bounding box of the origins for a bundle, then a similarity determination could be made based on a distance between the origin of the ray and the bounding box of the origins for the bundle, and whether this distance is below a threshold. If the direction vector of the ray has components which are larger than the maximum direction of the bundle or smaller than the minimum direction of the bundle, then a similarity determination could be made based on a difference between the direction vector of the ray and the minimum or maximum direction of the bundle, and whether this difference is below a threshold. These thresholds could be fixed or they could be percent-increase based thresholds, e.g. based on a percentage increase in the bounding box for the origins of the bundle or based on a percentage increase in the difference between the maximum and minimum direction vectors for the bundle if the ray were to be added to the bundle. In step S1008 the bundle builder 919 identifies a best match open bundle of said set of open bundles for the received ray based on the determined levels of similarity. For example, the open bundle which has the highest level of similarity with the ray may be identified in step S1008.

In step S1010 the bundle builder 919 determines whether the level of similarity of the ray with the best match open bundle is above a threshold level of similarity. In other words, the bundle builder 919 determines whether the ray is sufficiently similar to the best match open bundle for the ray to be added to the best match open bundle. If it is determined in step S1010 that the determined level of similarity of the received ray with the best match open bundle is above the threshold, then the method passes to step S1012 in which the received ray is added to the best match open bundle. If it is determined in step S1010 that the determined level of similarity for the best match open bundle is below the threshold, then the method passes to step S1014 in which a new bundle is created, i.e. a new open bundle is created which initially comprises no rays but to which rays can be added. As part of step S1014, if there is no space to create a new open bundle then an existing bundle may be selected and outputted from the bundle builder 919 and passed to the scheduler 901, in order to make space to create the new open bundle. Then in step S1016 the received ray is added to the new bundle.

In step S1018 bundles which are full (i.e. bundles which are ready to be tested for intersection with a box) are outputted from the bundle builder 919 and passed to the scheduler 901.

The scheduler 901 operates in a similar manner to the scheduler 301 described above. However, the scheduler 901 can form packets comprising pointers to rays and/or bundles of rays. It does not make a difference to the grouping of the pointers into packets whether the pointers are for individual rays or for bundles of rays. In other words, rays and bundles can be mixed within a packet, and a packet can contain multiple of each (i.e. pointers to multiple rays and to multiple ray bundles). The scheduler 901 groups, into packets, rays and/or bundles of rays which require access to the same block of memory 905. In other words, in step S1020, the scheduler 901 forms packets comprising one or both of indications of rays and indications of bundles of rays which will require access to the same block of memory for performing intersection testing. For example, rays and/or bundles which are to be tested with respect to the same box or object may be grouped into a packet, such that the data for the box or object can be fetched once from the memory 905 for use in the intersection testing of all of the rays and/or bundles in the packet. Once the scheduler has assembled the rays and/or bundles into a packet, the scheduler will issue the packet and cause the packet to join the request queue 903 to request the node data for the packet (i.e. data describing a box corresponding to the appropriate node of the acceleration structure against which the rays and/or bundles of the packet are to be tested for intersection) from memory 905. In step S1022 the node data for the packet is then retrieved from memory 905. In other words, in step S1022, data is fetched from the block of memory for performing intersection testing on the one or both of rays and bundles of rays indicated by the indications in the packet. In step S1024 the fetched data is passed to the tester module 307, so that the tester module 307 can perform intersection testing as described herein, e.g. with reference to the flow charts of FIG. 4, 11 or 12.

In a first example, there may be persistent root bundles. In this example, once a ray has been added to a bundle, it will not be separated from that bundle and grouped together into a different bundle. In other words, the bundle builder 919 only processes new rays in this example, i.e. primary rays and freshly spawned secondary rays. In this example, results output from the results processor 913 can go directly to the scheduler 901, or they could go to the bundle builder 919 which could then simply forward the results to the scheduler 901. FIG. 9 shows the output from the results processor 913 with a dashed line because in different implementations this output could go to either the bundle builder 919 or the scheduler 901. In this example, once a bundle has started traversal it can be broken down (e.g. split up into individual rays), but the rays within the bundle cannot be recombined or reformed into other bundles. In other words, the rays from which the bundles are constructed: (i) include new rays which have not previously been included in a bundle of rays, but (ii) do not include rays which have previously been included in a bundle of rays. In this example, since the bundle builder 919 only processes new rays it only needs to run fast enough to process a relatively small number of rays (e.g. one or two rays) each cycle. Furthermore, data for individual rays inside a bundle does not need to accessed on every iteration (e.g. to start each intersection test at each level of the acceleration structure) and instead just needs to be accessed when the bundle collapses, e.g. when the individual rays are split from the bundle. This allows the data for the bounding vectors of the bundle to be stored separately to the ray data of the individual rays, so the amount of data needed to perform a bundle intersection test is comparable (i.e. similar, e.g. approximately equal to) the amount of data needed to perform a ray intersection test on a single ray.

In a second example, bundles may be reformed. In this example, bundles would be broken down and reconstructed after every iteration of intersection tests (e.g. after each bundle intersection test). In this example, the tester module 907 would be modified to deconstruct bundles into individual rays and pass results for individual rays to the bundle builder 919. The bundle builder would be responsible for forming bundles as ray results arrive, and outputting the bundles to the scheduler 901. In some examples, the scheduler 901 could receive the results from the results processor 913 and form the bundles. Since the scheduler 901 handles coherence gathering for grouping rays and/or bundles into packets, it is not a major modification to have the scheduler 901 also form bundles of similar rays (noting that similar rays are coherent). In these examples, the rays from which the bundles are constructed include: new rays which have not previously been included in a bundle of rays, and rays which have previously been included in a bundle of rays which has been deconstructed. In these examples, bundles can be merged with other bundles or rays during traversal of an acceleration structure, which may provide more opportunities for getting the benefit from performing the bundle intersection tests (e.g. because bundles may include, on average, a larger number of rays, or because, on average, the similarity of the rays within a bundle may be increased (compared to the first example described in the preceding paragraph in which persistent root bundles are implemented)). However, in this second example, extra logic (e.g. extra hardware) would be required to form bundles for many rays per clock (where the number of rays per clock would be dependent upon the number of testing blocks in the tester module 907). This second example also requires reading of all the ray data for a packet on each iteration, which is not required in the first example described in the preceding paragraph.

The testing blocks described above (which may be configured to perform either an AllHit test or an AnyHit test on a bundle of rays) are also configured to perform intersection testing for a single ray. In other words, these testing blocks can be used as individual ray testers, e.g. for performing intersection testing for a ray with respect to a box. A single ray may be considered to be a bundle comprising a single ray. For a bundle comprising a single ray, the bounding vectors of the bundle would just be the direction vector of the single ray and the maximum and minimum components of the origin of the bundle would just be the components of the origin of the ray. In this situation, both the AllHit test and the AnyHit test described above would give the correct intersection testing results for the single ray in the bundle. This is useful because the ray tracing systems 300 and 900 do not need dedicated single ray testing blocks and dedicated bundle testing blocks: the same testing blocks can be used for performing both bundle intersection testing and single ray intersection testing. This reduces the likelihood of bottlenecking due to one type of testing block being saturated whilst another type of testing block is idle.

The tester module 907 comprises a memory 921 configured to store data describing a box which has been fetched from the memory 905 for performing the intersection testing with respect to the box. For example, the data for the box can be fetched from the memory 905 and stored in the local memory 921 when a bundle is to be tested for intersection with respect to the box. If the bundle collapses, i.e. if the rays in the bundle are split up into individual rays, the data for the individual rays can be fetched from the memory 905 (or from some other memory, e.g. an on-chip memory (e.g. part of the local memory 921) used for storing ray data close to the testing blocks) and tested for intersection with respect to the box using the data for the box that is stored in the local memory 921. The local memory 921 temporarily stores data for the box when it is fetched from the memory 905 so this data can be reused, e.g. when a bundle collapses, without taking a round-trip through memory 905, i.e. without re-fetching the data for the box from the memory 905.

Figure 11:
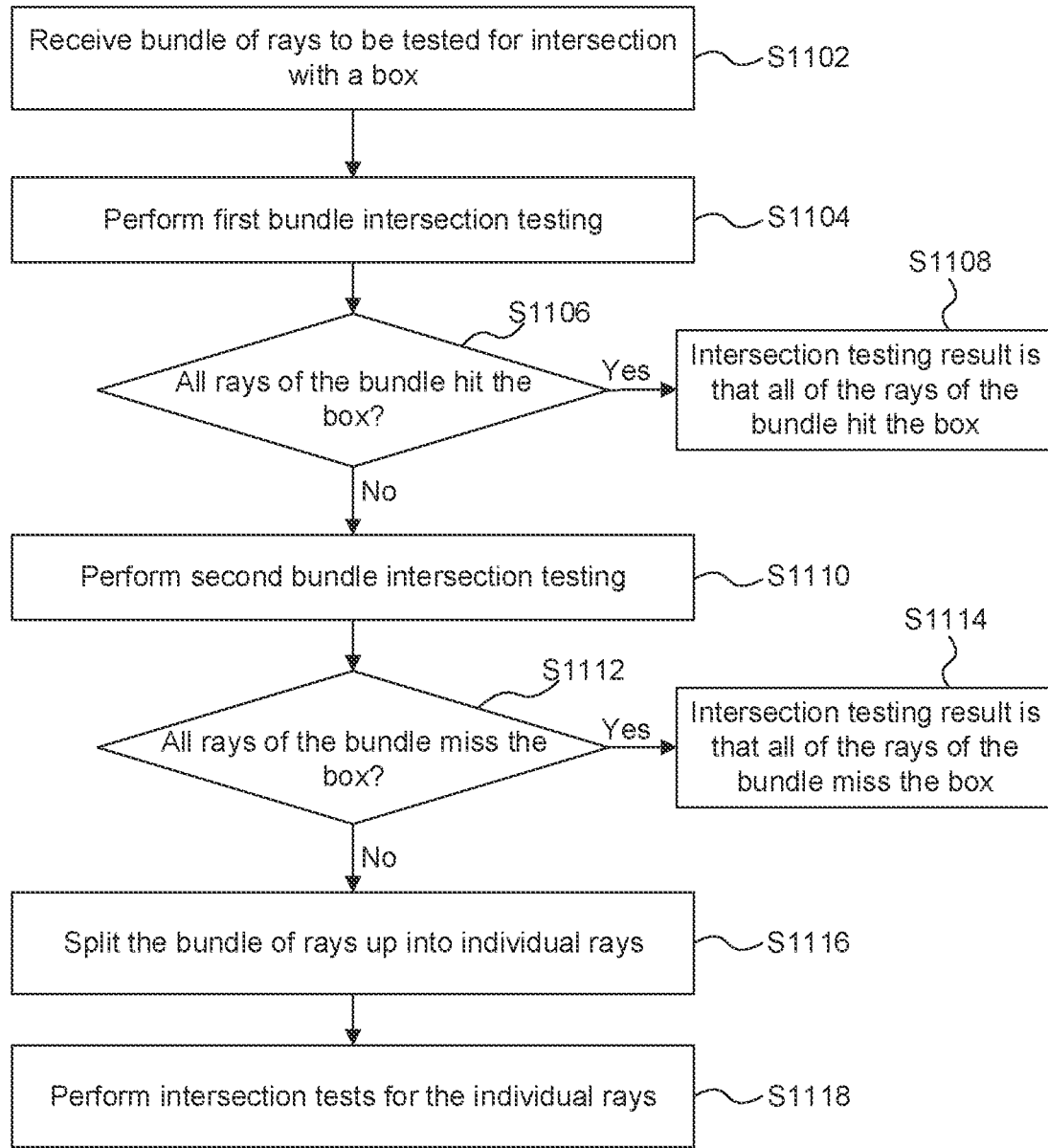
FIG. 11 is a flow chart for a method of performing intersection testing on a bundle of rays with respect to a box in a ray tracing system.

AllHit tests and AnyHit tests have been described above, and each of these two types of bundle intersection tests may be performed separately, each providing a benefit, e.g. a reduction in the total number of intersection tests that need to be performed. However, in some examples, both AllHit and AnyHit tests may be performed. For example, FIG. 11 shows a flow chart for a method of performing intersection testing at the ray tracing system 900.

In step S1102, the tester module 907 receives a bundle of rays to be tested for intersection with a box. In step S1104 a first testing block (e.g. testing block 915$_1$ or 917$_1$) performs a first bundle intersection test (i.e. an AllHit test) to determine whether or not all of the rays of the bundle intersect the box. As described above, the AllHit test has two possible outcomes: either (i) it is determined that all of the rays of the bundle hit the box, or (ii) it is not determined that all of the rays of the bundle hit the box. The result of the first bundle intersection test is considered in step S1106. If the first bundle intersection test determines that all of the rays of the bundle hit the box then the method passes from step S1106 to step S1108. In step S1108 it is determined that an intersection testing result for the bundle with respect to the box is that all of the rays of the bundle intersect the box.

If the first bundle intersection test does not determine that all of the rays of the bundle hit the box then the method passes from step S1106 to step S1110. In step S1110 a second testing block (e.g. testing block $915_2$ or $917_2$) performs a second bundle intersection test (i.e. an AnyHit test) to determine whether or not all of the rays of the bundle miss the box. As described above, the AnyHit test has two possible outcomes: either (i) it is determined that all of the rays of the bundle miss the box, or (ii) it is not determined that all of the rays of the bundle miss the box. The result of the second bundle intersection test is considered in step S1112. If the second bundle intersection test determines that all of the rays of the bundle miss the box then the method passes from step S1112 to step S1114. In step S1114 it is determined that the intersection testing result for the bundle with respect to the box is that all of the rays of the bundle miss the box.

If the second bundle intersection test does not determine that all of the rays of the bundle miss the box then the method passes from step S1112 to step S1116. Therefore, the method reaches step S1116 if the first bundle intersection test does not determine that all of the rays of the bundle intersect the box and if the second bundle intersection test does not determine that all of the rays of the bundle miss the box. In step S1116 the bundle of rays is split up into individual rays. For example, the results processor 913 can split up a bundle of rays into individual rays. Then in step S1118 intersection tests are performed for the individual rays with respect to the box to determine which of the individual rays intersect the box. Intersection testing may be performed on the individual rays by one or more of the testing blocks without first passing the individual rays back to the bundle builder 919 or the scheduler 901. After intersection testing has been performed on the individual rays, the results of the intersection testing for the individual rays may be output from the tester module 907 (e.g. from the results processor 913). If the intersection testing finds a hit for an individual ray then that ray can be processed as if it is a newly received ray to be tested against the boxes represented by the child nodes of the node representing the box that it has just been found to intersect. For example, the individual rays for which hits have been found may be output from the results processor 913 to the bundle builder 919 or the scheduler 901 so that the individual rays can be grouped into bundles and/or packets and passed to the request queue 903, so that they can be processed as if they were newly received rays to be tested against the boxes represented by the child nodes of the node representing the box that they have just been found to intersect. As mentioned above, data for the box may be stored in the local memory 921 and the same testing blocks (e.g. $915_1$, $915_2$, $917_1$ and $917_2$) may be used to perform the intersection tests for the individual rays with respect to the box.

In the method shown in the flow chart of FIG. 11 the second bundle intersection testing (e.g. the AnyHit testing) is performed conditionally based on the result of the first bundle intersection testing (e.g. the All Hit testing). In other words, in this example, the AnyHit testing is performed for a bundle with respect to a box in response to the result of the AllHit test not being a determination that all of the rays of the bundle hit the box. This is an example of how the method could be implemented in software, e.g. if the testing blocks in the tester module 907 are implemented as blocks of software code which can be executed on a processing unit.

Figure 12:
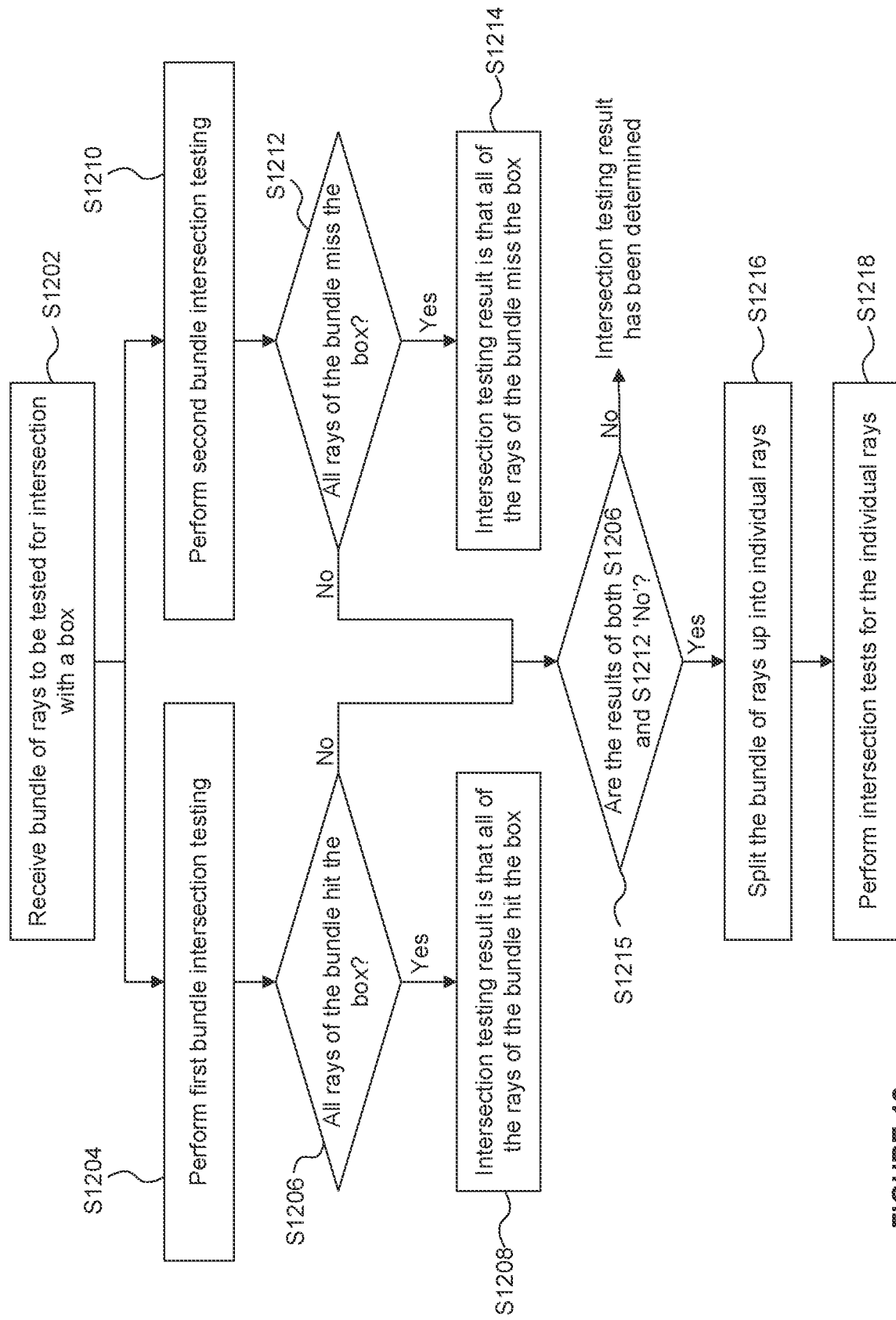
FIG. 12 is a flow chart for another method of performing intersection testing on a bundle of rays with respect to a box in a ray tracing system.

FIG. 12 shows a flow chart for another method of performing intersection testing at the ray tracing system 900. The flow chart may be more suitable for being implemented in hardware, e.g. if the testing blocks in the tester module 907 are hardware blocks (e.g. implemented in fixed function circuitry) configured to perform intersection testing. In the method shown in FIG. 12 the first bundle intersection testing (e.g. AllHit testing) and the second bundle intersection testing (e.g. AnyHit testing) are both performed for a bundle of rays with respect to a box unconditionally, i.e. without dependence upon the result of the other bundle intersection testing for the bundle of rays with respect to the box. In particular, the second bundle intersection testing (e.g. AnyHit testing) is performed irrespective of the result of the first bundle intersection testing (e.g. AllHit testing).

In step S1202, the tester module 907 receives a bundle of rays to be tested for intersection with a box. Following step S1202, steps S1204 and S1210 are performed in parallel. In step S1204 a first testing block (e.g. testing block $915_1$ or $917_1$) performs a first bundle intersection test (i.e. an AllHit test) to determine whether or not all of the rays of the bundle intersect the box. The result of the first bundle intersection test is considered in step S1206. If the first bundle intersection test determines that all of the rays of the bundle hit the box then the method passes from step S1206 to step S1208. In step S1208 it is determined that an intersection testing result for the bundle with respect to the box is that all of the rays of the bundle intersect the box. If the first bundle intersection test does not determine that all of the rays of the bundle hit the box then the method passes from step S1206 to step S1215.

In step S1210 a second testing block (e.g. testing block $915_2$ or $917_2$) performs a second bundle intersection test (i.e. an AnyHit test) to determine whether or not all of the rays of the bundle miss the box. The result of the second bundle intersection test is considered in step S1212. If the second bundle intersection test determines that all of the rays of the bundle miss the box then the method passes from step S1212 to step S1214. In step S1214 it is determined that the intersection testing result for the bundle with respect to the box is that all of the rays of the bundle miss the box. If the second bundle intersection test does not determine that all of the rays of the bundle miss the box then the method passes from step S1212 to step S1215.

The results from both the first testing block and the second testing block are passed to the results processor 913. In step S1215 the results processor 913 determines whether the results of both steps S1206 and S1212 are 'No'. In other words, the results processor 913 determines whether both: (i) the AllHit test does not determine that all of the rays of the bundle hit the box, and (ii) the AnyHit test does not determine that all of the rays of the bundle miss the box. If this is the case, the method passes from step S1215 to step S1216. In step S1216 the results processor 913 splits up the bundle of rays into individual rays. Then in step S1218 intersection tests are performed for the individual rays with respect to the box to determine which of the individual rays intersect the box. The individual rays (or references to the individual rays, e.g. ray IDs) may be output from the results processor back to one or more of the testing blocks for performing the intersection testing on the individual rays. Alternatively, the individual rays may be output from the results processor 913 and processed as if they were newly received rays. For example, the individual rays may be output from the results processor 913 to the bundle builder 919 or the scheduler 901 so that the individual rays can be grouped into bundles and/or packets and passed to the request queue 903, so that they can be processed as if they were newly received rays. As mentioned above, data for the box may be stored in the local memory 921 and the same testing blocks (e.g. $915_1$, $915_2$, $917_1$ and $917_2$) may be used to perform the intersection tests for the individual rays with respect to the box.

In some examples, the ray data for the rays can be stored in an on-chip memory (as part of the local memory 921), and each ray has an identifier (which may be referred to as a "RayID"). Where we describe passing "rays" between blocks, in some examples, this can be implemented by passing RayIDs between the blocks, such that the actual ray data for the rays (e.g. the ray origin and direction etc.) does not need to be passed between the blocks. A testing block (e.g. 915 or 917) can read the ray data indicated by a RayID just before it is to perform an intersection on the ray, e.g. by fetching the ray data from the local memory. In examples in which bundles are recreated, the ray data may be pipelined from the tester module 907 to the bundle builder 919 so it has ray data for creating the bundles.

The structure of the packets created by the scheduler 901 may be an indication of a location of data in memory and a list, e.g. a linked list, of blocks of RayIDs. The scheduler 901 builds up the lists of RayIDs for each packet it is creating. Each of the bundles could have its own RayID, and a pointer to a list of RayIDs for each ray in the bundle. If a bundle is to be collapsed (i.e. split up into individual rays), the results processor 913 may pass the pointers for the individual rays back to the frontend of the tester module 907. In essence, the packet for individual rays has been created a priori by the results processor 913 in this case. The testing blocks of the tester module 907 read the ray data for the individual rays right before each intersection test as normal.

In general, packets contain references to rays, and the ray data is fetched by the tester module when it is to be used for intersection testing.

If in step S1215 the results processor 913 determines that the result of either step S1206 or step S1212 is 'Yes' (in other words, if the results processor 913 determines that: (i) the AllHit test determines that all of the rays of the bundle hit the box, or (ii) the AnyHit test determines that all of the rays of the bundle miss the box) then the method performed by the testing blocks ends after step S1215 because an intersection testing result has been already been determined for the bundle with respect to the box. In other words either the AllHit test or the AnyHit test has determined the intersection testing result for the bundle with respect to the box and this result has been output to the results processor 913, so there is no need to split up the bundle into individual rays in order to determine the intersection testing result for all of the rays of the bundle with respect to the box.

In both of the examples shown in FIGS. 11 and 12, if the first bundle intersection test (e.g. the AllHit test) does not determine that all of the rays of the bundle intersect the box, a result of performing the second bundle intersection test (e.g. the AnyHit test) is used to determine the intersection testing result for the bundle with respect to the box. The main difference between the two methods is that in the method of FIG. 11, the second bundle intersection test is performed conditionally based on the result of the first bundle intersection test; whereas in the method of FIG. 12, the first and second bundle intersection tests are performed concurrently, in parallel. In other words, in the method of FIG. 12, the second bundle intersection test (e.g. the AnyHit test) is performed irrespective of the result of the first bundle intersection test (e.g. the AllHit test).

In some other examples, which are not described in detail herein, it would be possible to perform the first bundle intersection test (e.g. the AllHit test) conditionally based on the result of the second bundle intersection test (e.g. the AnyHit test). In these other examples, if the AnyHit test determined that all of the rays of the bundle miss the box then the AllHit test would not be performed, whereas if the result of the AnyHit test is not a determination that all of the rays of the bundle miss the box then the AllHit test would be performed.

As described above, the tester module 907 of the ray tracing system 900 comprises pairs of testing blocks wherein each pair of testing blocks comprises an AllHit testing block and an AnyHit testing block. The tester module 907 is configured to pass a bundle of rays and data representing a box to a pair of testing blocks (e.g. testing blocks $915_1$ and $915_2$), such that the first testing block $915_1$ of the pair of testing blocks performs the first bundle intersection test (e.g. the AllHit test) on the bundle of rays with respect to the box, and the second testing block $915_2$ of the pair of testing blocks performs the second bundle intersection test (e.g. the AnyHit test) on the bundle of rays with respect to the box. In this way, when intersection testing is being performed for a bundle of rays, the bundle is passed to both testing blocks of a pair of testing blocks for intersection testing.

As described above, the testing blocks can also be used to perform intersection tests for individual rays. The tester module 907 is configured to pass first and second individual rays and data representing a box to a pair of testing blocks (e.g. testing blocks $915_1$ and $915_2$), such that the first testing block $915_1$ of the pair of testing blocks performs an intersection test on the first individual ray with respect to the box, and the second testing block $915_2$ of the pair of testing blocks performs an intersection test on the second individual ray with respect to the box. In this way, when intersection testing is being performed for individual rays, two individual rays can be passed to the respective testing blocks of a pair of testing blocks for intersection testing. It can therefore be appreciated that in some examples, a bundle of rays will occupy a pair of testing blocks at a time, while single rays only occupy one testing block at a time.

Figure 13A:
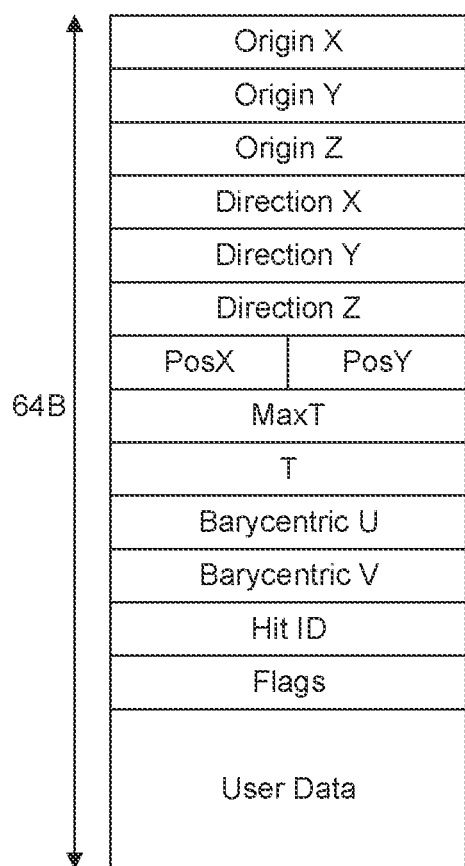
FIG. 13a shows an example data structure for storing data of a ray.

FIG. 13a shows an example data structure for storing data for a ray. In this example, each ray has 64 bytes of data. As shown in FIG. 13a, the ray data for a ray includes x, y and z components of the origin of the ray; x, y and z components of the direction vector of the ray; x and y components ("PosX" and "PosY") to indicate a screen space position with which the ray is associated, which can be used to write back a result; a maximum distance that the ray can travel ("MaxT"); a distance to a nearest hit ("T"); barycentric U and V components of a hit point on a primitive; an ID of a shader on a hit primitive ("hit ID"); one or more flags which can be used to implement various per-ray API features, such as backface culling; and user data which can be written to, e.g. by shader programs.

Figure 13B:
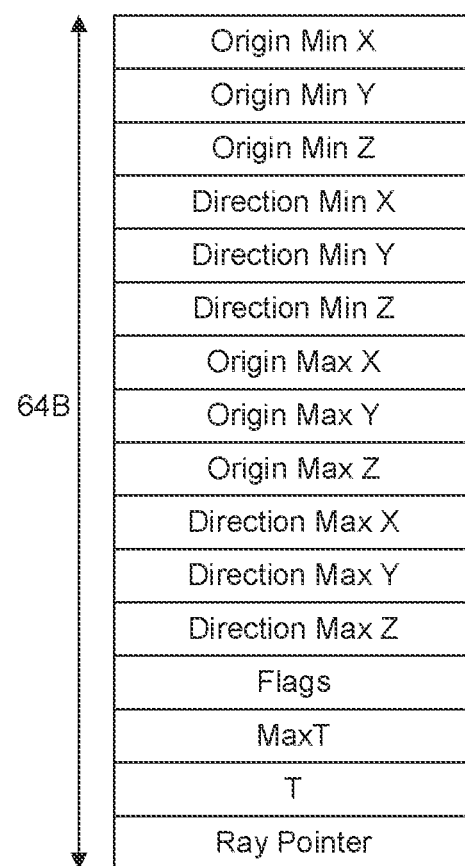
FIG. 13b shows an example data structure for storing data of a bundle of rays.

The data for a bundle of rays is stored in a data structure and comprises origin data for the bundle of rays; vector data describing the components of the vectors providing the bounds to the bundle of rays; and one or more pointers to ray data for the rays of the bundle of rays. For example, FIG. 13b shows a data structure for storing data for a bundle of rays. In this example, each bundle of rays has 64 bytes of data. In the example shown in FIG. 13b, each row represents a value having 32 bits of data. Having the same size data structures for ray data and for bundle data is convenient because it allows bundles and rays to be packed together into packets easily. As shown in FIG. 13b, the data for a bundle of rays includes minimum and maximum x, y and z components of the origin of the bundle of rays; minimum and maximum x, y and z components of the bounding vectors of the bundle of rays; a maximum distance that the bundle of rays can travel ("MaxT"); a distance to a nearest hit ("T"); one or more flags which can be used to implement various per-ray API features, such as backface culling; and one or more ray pointers which indicate data for the rays of the bundle. For example, a ray pointer could point to another packet of data which contains all of the ray data for the rays which make up the bundle. This ray pointer would be followed once per bundle, when the bundle is broken down into individual rays. For example, the results processor 913 can pass this pointer back to the test queue 909, and it gets treated the same as when a pointer to a list of rays comes from the scheduler path (e.g. from the request queue 903).

In some examples, a bundle of rays may be split up into individual rays if a splitting metric is satisfied. For example, the splitting metric may be based on one or more of: a number of rays in the bundle of rays; a spread of the rays in the bundle of rays; a size of an area defined by the silhouette edges of the box; whether the source of the rays in the bundle of rays is a frame shader or a ray shader; and data provided by the shader which created the rays in the bundle of rays (e.g. information relating to how diffuse a ray is). For example, if the number of rays in a bundle is below a threshold then the bundle may be deconstructed, i.e. split up into individual rays. The benefit provided by performing bundle intersection testing rather than individual ray intersection testing is not so large if there are not so many rays in the bundle. For example, if there are only two rays in a bundle, it may be better to split the rays up and test them individually rather than performing bundle intersection tests. As another example, if the spread of rays in a bundle is above a threshold then it may be considered that the rays are too divergent and the bundle may be split up. In this case, if the spread of the rays in a bundle is too large then the rays are less likely to have the same intersection testing results, so performing the bundle intersection tests is less beneficial. The larger the spread of the rays in a bundle, the bigger the difference between the maximum and minimum bounding vector components for the bundle.

Figure 14:
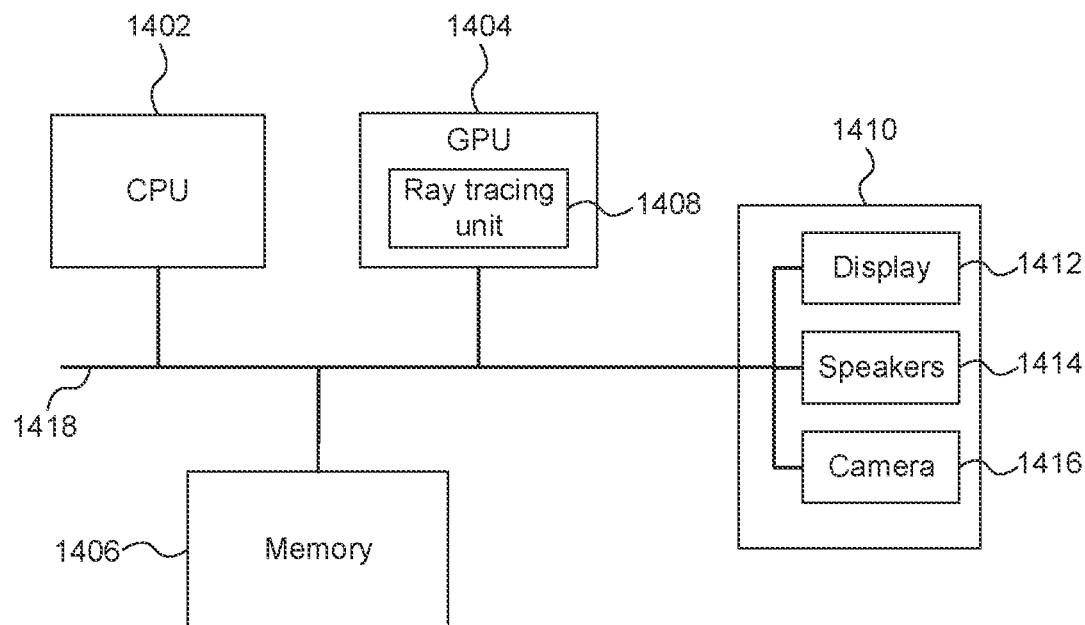
FIG. 14 shows a computer system in which a ray tracing system is implemented.

FIG. 14 shows a computer system in which the ray tracing systems described herein may be implemented. The computer system comprises a CPU 1402, a GPU 1404, a memory 1406 and other devices 1410, such as a display 1412, speakers 1414 and a camera 1416. A ray tracing unit 1408 is implemented on the GPU 1404. The components of the computer system can communicate with each other via a communications bus 1418. The ray tracing unit 1408 may operate with part of the memory 1406 to implement the ray tracing system 300 or the ray tracing system 900 described above. In some examples the ray tracing system may be implemented separately from the GPU 1404.

The ray tracing systems 300 and 900 are shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing systems described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

Therefore, there may be provided a method of manufacturing, at an integrated circuit manufacturing system, a ray tracing system as described herein. Furthermore, there may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 15.

Figure 15:
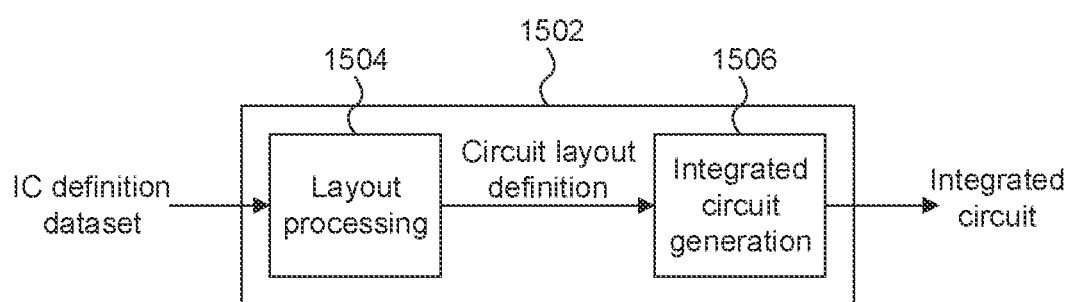
FIG. 15 shows an integrated circuit manufacturing system for generating an integrated circuit embodying a ray tracing system as described herein

FIG. 15 shows an example of an integrated circuit (IC) manufacturing system 1502 which is configured to manufacture a ray tracing system as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 1502 to manufacture an integrated circuit embodying a ray tracing system as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits)

performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A ray tracing system comprising:
   a tester module configured to receive a bundle of rays to be tested for intersection with a box, wherein the tester module comprises:
     a first testing block configured to perform a first bundle intersection test to determine whether or not all of the rays of the bundle intersect the box, wherein if the first bundle intersection test determines that all of the rays of the bundle intersect the box, an intersection testing result for the bundle with respect to the box is that all of the rays of the bundle intersect the box; and
     a second testing block configured to perform a second bundle intersection test to determine whether or not all of the rays of the bundle miss the box, wherein if the second bundle intersection test determines that all of the rays of the bundle miss the box, the intersection testing result for the bundle with respect to the box is that all of the rays of the bundle miss the box, wherein the second testing block is configured to perform said second bundle intersection test irrespective of the result of the first bundle intersection test performed by the first testing block, and
   wherein the tester module is configured to, if the first bundle intersection test does not determine that all of the rays of the bundle intersect the box and if the second bundle intersection test does not determine that all of the rays of the bundle miss the box:
     split the bundle of rays up into individual rays; and
     perform intersection tests for the individual rays with respect to the box to determine which of the individual rays intersect the box.

2. The ray tracing system of claim 1 wherein the second testing block is configured to perform said second bundle intersection test for the bundle with respect to the box in response to the result of the first bundle intersection test performed by the first testing block for the bundle with respect to the box being that the first bundle intersection test did not determine that all of the rays of the bundle intersect the box.

3. The ray tracing system of claim 1 wherein the tester module is configured to use one or both of the first testing block and the second testing block to perform said intersection tests for the individual rays with respect to the box.

4. The ray tracing system of claim 1 wherein the tester module comprises:
   one or more first testing blocks, wherein each of the one or more first testing blocks is configured to perform a first bundle intersection test to determine whether or not all rays of a bundle intersect a box; and
   one or more second testing blocks, wherein each of the one or more second testing blocks is configured to perform a second bundle intersection test to determine whether or not all rays of a bundle miss a box,
   wherein the testing blocks are organised into pairs of testing blocks, each pair of testing blocks comprising: (i) one first testing block from the one or more first testing blocks, and (ii) one second testing block from the one or more second testing blocks.

5. The ray tracing system of claim 4 wherein the tester module is configured to pass a bundle of rays and data representing a box to a pair of testing blocks, such that the first testing block of the pair of testing blocks performs the first bundle intersection test on the bundle of rays with respect to the box, and the second testing block of the pair of testing blocks performs the second bundle intersection test on the bundle of rays with respect to the box.

6. The ray tracing system of claim 4 wherein the tester module is configured to pass first and second individual rays and data representing a box to a pair of testing blocks, such that the first testing block of the pair of testing blocks performs an intersection test on the first individual ray with respect to the box, and the second testing block of the pair of testing blocks performs an intersection test on the second individual ray with respect to the box.

7. The ray tracing system of claim 1 further comprising a bundle builder configured to:
   receive rays; and
   group received rays together based on their similarity to thereby construct bundles of rays to be tested for intersection with the box.

8. The ray tracing system of claim 7 wherein the bundle builder is configured to:
   maintain a set of open bundles to which new rays can be added; and
   for each of the received rays:
     determine a level of similarity of the received ray with each of the open bundles;
     identify a best match open bundle of said set of open bundles for the received ray based on the determined levels of similarity; and
     if the determined level of similarity for the best match open bundle is above a threshold, add the received ray to the best match open bundle.

9. The ray tracing system of claim 8 wherein the bundle builder is further configured to, for each of the received rays:
   if the determined level of similarity for the best match open bundle is below the threshold, create a new bundle and add the received ray to the new bundle.

10. The ray tracing system of claim 7 wherein said received rays which are grouped together to construct bundles: (i) include new rays which have not previously been included in a bundle of rays, but (ii) do not include rays which have previously been included in a bundle of rays.

11. The ray tracing system of claim 7 wherein said received rays which are grouped together to construct bundles include:

new rays which have not previously been included in a bundle of rays, and
rays which have previously been included in a bundle of rays which has been deconstructed.

12. The ray tracing system of claim 1 further comprising a scheduler configured to:
form packets comprising one or both of indications of rays and indications of bundles of rays which will require access to the same block of memory for performing intersection testing; and
cause data to be fetched from the block of memory and passed to the tester module for performing intersection testing on the one or both of rays and bundles of rays indicated by the indications in the packet.

13. A computer-implemented method of performing intersection testing in a ray tracing system, the method comprising:
receiving a bundle of rays to be tested for intersection with a box;
performing a first bundle intersection test to determine whether or not all of the rays of the bundle intersect the box, wherein if the first bundle intersection test determines that all of the rays of the bundle intersect the box, an intersection testing result for the bundle with respect to the box is that all of the rays of the bundle intersect the box; and
if the first bundle intersection test does not determine that all of the rays of the bundle intersect the box, using a result of performing a second bundle intersection test, which determines whether or not all of the rays of the bundle miss the box, to determine the intersection testing result for the bundle with respect to the box,
wherein if the result of performing the second bundle intersection test indicates that all of the rays of the bundle miss the box, the intersection testing result for the bundle with respect to the box is that all of the rays of the bundle miss the box, wherein the second bundle intersection test is performed irrespective of the result of the first bundle intersection test performed by the first testing block, and
wherein if the first bundle intersection test does not determine that all of the rays of the bundle intersect the box and if the result of performing the second bundle intersection test does not indicate that all of the rays of the bundle miss the box, then the method further comprises:
splitting the bundle of rays up into individual rays; and
performing intersection tests for the individual rays with respect to the box to determine which of the individual rays intersect the box.

14. The method of claim 13 wherein there are only two possible results from the first bundle intersection test: either (i) the first bundle intersection test determines that all of the rays of the bundle intersect the box, or (ii) the first bundle intersection test does not determine that all of the rays of the bundle intersect the box.

15. The method of claim 13 wherein there are only two possible results from the second bundle intersection test: either (i) the second bundle intersection test determines that all of the rays of the bundle miss the box, or (ii) the second bundle intersection test does not determine that all of the rays of the bundle miss the box.

16. The method of claim 13 wherein performing the first bundle intersection test for the bundle of rays with respect to the box comprises:
identifying silhouette edges of the box from the perspective of the bundle of rays;
for each of the identified silhouette edges:
obtaining components of a vector providing an external bound to the bundle of rays with respect to said identified silhouette edge, such that the vector is at least as likely as any of the rays of the bundle to pass outside said identified silhouette edge; and
determining whether the vector passes inside or outside of the silhouette edge; and
using results of determining, for each of the identified silhouette edges, whether the vector passes inside or outside of the silhouette edge, to determine an intersection testing result for the bundle of rays with respect to the box,
wherein if it is determined that, for each of the identified silhouette edges, the vector passes inside the respective identified silhouette edge, then the intersection testing result for the bundle of rays with respect to the box is that all of the rays in the bundle of rays intersect the box; and
wherein if it is determined that, for one or more of the identified silhouette edges, the vector passes outside the respective identified silhouette edge, then the intersection testing result for the bundle of rays with respect to the box is not that all of the rays in the bundle of rays intersect the box.

17. The method of claim 13 wherein performing the second bundle intersection test for the bundle of rays with respect to the box comprises:
identifying silhouette edges of the box from the perspective of the bundle of rays;
for each of the identified silhouette edges:
obtaining components of a vector providing an internal bound to the bundle of rays with respect to said identified silhouette edge, such that the vector is at least as likely as any of the rays of the bundle to pass inside said identified silhouette edge; and
determining whether the vector passes inside or outside of the silhouette edge; and
using results of determining, for each of the identified silhouette edges, whether the vector passes inside or outside of the silhouette edge, to determine an intersection testing result for the bundle of rays with respect to the box,
wherein if it is determined that, for each of the identified silhouette edges, the vector passes inside the respective identified silhouette edge, then the intersection testing result for the bundle of rays with respect to the box is not that all of the rays in the bundle of rays miss the box; and
wherein if it is determined that, for one or more of the identified silhouette edges, the vector passes outside the respective identified silhouette edge, then the intersection testing result for the bundle of rays with respect to the box is that all of the rays in the bundle of rays miss the box.

18. A computer readable storage medium having stored thereon an integrated circuit definition dataset that, when processed in an integrated circuit manufacturing system, configures the integrated circuit manufacturing system to manufacture a ray tracing system which comprises:
a tester module configured to receive a bundle of rays to be tested for intersection with a box, wherein the tester module comprises:
a first testing block configured to perform a first bundle intersection test to determine whether or not all of the rays of the bundle intersect the box, wherein if the first bundle intersection test determines that all of the rays of the bundle intersect the box, an intersection testing result for the bundle with respect to the box is that all of the rays of the bundle intersect the box; and a second testing block configured to perform a second bundle intersection test to determine whether or not all of the rays of the bundle miss the box, wherein if the second bundle intersection test determines that all of the rays of the bundle miss the box, the intersection testing result for the bundle with respect to the box is that all of the rays of the bundle miss the box, wherein the second testing block is configured to perform said second bundle intersection test irrespective of the result of the first bundle intersection test performed by the first testing block, and wherein the tester module is configured to, if the first bundle intersection test does not determine that all of the rays of the bundle intersect the box and if the second bundle intersection test does not determine that all of the rays of the bundle miss the box:

split the bundle of rays up into individual rays; and perform intersection tests for the individual rays with respect to the box to determine which of the individual rays intersect the box.

* * * * *